US011868509B2

(12) United States Patent
Meirosu

(10) Patent No.: US 11,868,509 B2
(45) Date of Patent: Jan. 9, 2024

(54) METHOD AND ARRANGEMENT FOR DETECTING DIGITAL CONTENT TAMPERING

(71) Applicant: Telefonaktiebolaget LM Ericsson (publ), Stockholm (SE)

(72) Inventor: Catalin Meirosu, Sollentuna (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 245 days.

(21) Appl. No.: 16/764,764

(22) PCT Filed: Nov. 17, 2017

(86) PCT No.: PCT/SE2017/051145
§ 371 (c)(1),
(2) Date: May 15, 2020

(87) PCT Pub. No.: WO2019/098895
PCT Pub. Date: May 23, 2019

(65) Prior Publication Data
US 2020/0372184 A1    Nov. 26, 2020

(51) Int. Cl.
*G06F 21/64* (2013.01)
*G06F 21/60* (2013.01)
*H04L 9/32* (2006.01)

(52) U.S. Cl.
CPC ............ *G06F 21/64* (2013.01); *G06F 21/602* (2013.01); *H04L 9/3236* (2013.01); *H04L 9/3247* (2013.01)

(58) Field of Classification Search
CPC ...... G06F 21/64; G06F 21/602; G06F 21/645; H04L 9/3236; H04L 9/3247;
(Continued)

(56) References Cited

U.S. PATENT DOCUMENTS 7,814,070 B1 * 10/2010 Kaminski, Jr. ....... H04L 9/3236
                                                     707/698
10,114,969 B1 * 10/2018 Chaney .................. G06F 21/64
(Continued)

FOREIGN PATENT DOCUMENTS

CA         3039896 A1 *  4/2018   ............. G06Q 20/06
CA         2979250 A1 *  3/2019   ............... G06F 7/00
(Continued)

OTHER PUBLICATIONS

Aravind Ramachandran, Using Blockchain and smart contracts for secure data provenance management, Sep. 28, 2017, Subjects: Cryptography and Security (cs.CR), 11 pages (Year: 2017).*
(Continued)

*Primary Examiner* — Shahriar Zarrineh
(74) *Attorney, Agent, or Firm* — Rothwell, Figg, Ernst & Manbeck, P.C.

(57) ABSTRACT

A method for creating a tamper-evident digital content. The method includes receiving a portion of the digital content at a computing device. The method further includes encrypting the portion of the digital content by the computing device when the portion of the digital content is selected for proof-of-verification. The method further includes sending the encrypted portion of the digital content from the computing device to a distributed ledger system. The method further includes retrieving, by the computing device, hash identification data associated with the encrypted portion of the digital content from the distributed ledger system. The method further includes creating, by the computing device, an updated portion of the digital content using the retrieved hash identification data. The method further includes storing the updated portion of the digital content in a storage device by the computing device.

16 Claims, 10 Drawing Sheets

(58) Field of Classification Search
CPC ... H04L 2209/60; H04L 9/006; H04L 9/3239; H04L 2209/38; H04L 63/123; H04N 21/23476; H04N 21/854; H04N 21/4623; H04N 21/835; H04N 21/8355; G06Q 2220/00; G06Q 20/02; G06Q 20/1235; G06Q 20/3827; G06Q 20/401; H04W 12/106

See application file for complete search history.

(56) References Cited

U.S. PATENT DOCUMENTS

| | | | |
|---|---|---|---|
| 10,762,506 B1* | 9/2020 | Cash | G06Q 20/206 |
| 11,282,137 B2* | 3/2022 | McDonald | G06Q 20/204 |
| 2003/0040838 A1* | 2/2003 | Lagunzad | G06Q 20/12 700/232 |
| 2003/0084298 A1* | 5/2003 | Messerges | H04L 9/3236 713/176 |
| 2007/0124247 A1* | 5/2007 | Pinkas | G06Q 20/3829 705/50 |
| 2010/0205461 A1* | 8/2010 | Satou | H04L 9/0833 713/193 |
| 2010/0306815 A1* | 12/2010 | Emerson | H04N 21/4627 725/134 |
| 2015/0288704 A1 | 10/2015 | Huang et al. | |
| 2016/0292672 A1* | 10/2016 | Fay | G06Q 20/3829 |
| 2017/0046806 A1* | 2/2017 | Haldenby | G06F 21/62 |
| 2017/0070778 A1 | 3/2017 | Zerlan | |
| 2017/0134162 A1* | 5/2017 | Code | H04L 9/3236 |
| 2017/0249482 A1 | 8/2017 | Takaal et al. | |
| 2017/0331635 A1* | 11/2017 | Barinov | H04L 9/0643 |
| 2017/0353309 A1* | 12/2017 | Gray | G06F 21/51 |
| 2017/0364702 A1* | 12/2017 | Goldfarb | G06F 21/6218 |
| 2018/0020392 A1* | 1/2018 | Eller | H04W 76/20 |
| 2018/0096163 A1* | 4/2018 | Jacques de Kadt | G06Q 10/087 |
| 2019/0020468 A1* | 1/2019 | Rosenoer | H04L 9/3242 |
| 2019/0050541 A1* | 2/2019 | Wright | H04L 9/3236 |
| 2019/0057382 A1* | 2/2019 | Wright | H04L 9/0891 |
| 2019/0068636 A1* | 2/2019 | Wang | H04L 9/3247 |
| 2019/0080392 A1* | 3/2019 | Youb | G06F 21/64 |
| 2019/0081796 A1* | 3/2019 | Chow | G06Q 20/3827 |
| 2019/0123889 A1* | 4/2019 | Schmidt-Karaca | H04L 9/0618 |
| 2020/0234386 A1* | 7/2020 | Blackman | H04L 9/30 |

FOREIGN PATENT DOCUMENTS

| | | | | |
|---|---|---|---|---|
| CA | 3009970 C | * | 9/2020 | G06F 16/137 |
| CN | 101364415 A | * | 2/2009 | G06F 21/10 |
| CN | 103380589 B | * | 4/2016 | G06F 21/10 |
| CN | 106897348 A | | 6/2017 | |
| CN | 107104977 A | | 8/2017 | |
| CN | 107316239 A | * | 11/2017 | G06F 16/2255 |
| CN | 107924389 A | * | 4/2018 | G06F 16/219 |
| CN | 108476214 A | * | 8/2018 | H04L 65/4084 |
| CN | 108063752 B | * | 5/2020 | G06F 21/6245 |
| CN | 107248984 B | * | 6/2020 | G06F 21/602 |
| CN | 111771194 A | * | 10/2020 | G06F 21/32 |
| CN | 107770115 B | * | 1/2021 | G06F 16/1834 |
| CN | 113767382 A | * | 12/2021 | G06Q 20/02 |
| EP | 2988238 A1 | | 2/2016 | |
| EP | 3 502 926 A1 | | 6/2019 | |
| EP | 3413507 B1 | * | 5/2022 | G06F 21/645 |
| JP | 6429962 B1 | * | 11/2018 | |
| JP | 2019506103 A | * | 2/2019 | |
| JP | 6775086 B2 | * | 10/2020 | G06F 21/00 |
| KR | 20070022257 A | * | 2/2007 | |
| KR | 1020160127878 | * | 4/2015 | |
| KR | 20160127878 A | | 11/2016 | |
| KR | 20180036140 A | * | 4/2018 | |
| KR | 101841928 B1 | * | 5/2018 | |
| KR | 101882802 B1 | * | 7/2018 | |
| KR | 20180079806 A | * | 7/2018 | |
| KR | 20200061802 A | * | 6/2020 | |
| WO | WO-2017090041 A1 | * | 6/2017 | G06F 21/6245 |
| WO | WO-2017106792 A1 | * | 6/2017 | G06F 21/32 |
| WO | WO-2017195164 A1 | * | 11/2017 | G06F 16/152 |
| WO | WO-2017203093 A1 | * | 11/2017 | G06F 16/1824 |
| WO | WO-2018126344 A1 | * | 7/2018 | G06F 21/64 |
| WO | 2018213916 A1 | | 11/2018 | |

OTHER PUBLICATIONS

Craig Wright, Sustainable Blockchain-Enabled Services: Smart Contracts, 2017 IEEE International Conference on Big Data (BIGDATA), 10 pages (Year: 2017).*

Adam Hemlin Billström et al., "Video Integrity through Blockchain Technology", Kth Royal Institute of Technology, Aug. 2, 2017 (96 pages).

International Search Report and Written Opinion dated Sep. 27, 2018 issued in International Application No. PCT/SE2017/051145. (14 pages).

* cited by examiner

METHOD AND ARRANGEMENT FOR DETECTING DIGITAL CONTENT TAMPERING

CROSS REFERENCE TO RELATED APPLICATION(S)

This application is a 35 U.S.C. § 371 National Stage of International Patent Application No. PCT/SE2017/051145, filed Nov. 17, 2017, designating the United States.

TECHNICAL FIELD

The invention relates generally to detecting digital content tampering, specifically methods and arrangements for creating tamper-evident digital content and detecting tampering of digital content using the created tamper-evident digital content.

BACKGROUND

Recent advancements in areas like face rendering, image and sound processing using techniques such as Artificial Intelligence (AI) allows to modify digital content such as videos, both in real-time, and for stored content; for example by inserting or deleting visuals of people and sounds that were not present in the original video footage. These advancements have made it extremely easy to alter digital content, and such modified digital content is appearing with increasing frequency in the public and private domains. The process of detecting whether digital content has been tampered with is extremely difficult and expensive. Different techniques are known and currently used in the area of digital content verification and detection of tampering. While useful in many different contexts, these techniques may provide only a partial solution. No foolproof solutions are available that allow for establishing whether the video has been tampered with, except in the context of detecting copyrighted content. Such solutions do however require exhaustive infrastructure such as encryption keys or alternately steganography.

Blockchain-based solutions are being used in the area of digital content verification and tamper detection. While cryptocurrencies are the most prevalent application today in blockchain-based solutions, the proof-of-creation for documents is an emerging application of blockchain techniques. Currently, the creation of a document can be registered with a blockchain transaction wherein the document is described in the metadata associated to the transaction. Once the transaction is recorded, the blockchain protects against modifications of that transaction information. This information can be retrieved from the blockchain at a later point in time, which provides a proof of when the document was originally registered. So, a simple way of establishing whether the video has been tampered with would be to store a checksum or hash value on the blockchain at the time when the proof of existence is created. While such a solution could be automated, for example via a script that calculates the value and then verifies it against the blockchain, it is rather time consuming because of the manual work involved in determining the correct parameters for executing the script. Also, these solutions could not be applied in scenarios where verification of live or real-time transmission of digital content needs to be performed.

A simple solution for timestamping video on a proof-of-work blockchain (Bitcoin) was proposed in [1]. The solution focused on trusted timestamping and addressed the video tampering by including a hash in the blockchain transaction; however, the smallest amount of transactional currency needs to be included in the transaction. A method for logging and authenticating content using blockchains was proposed in [3], allowing for the case of video content to register hashes to a blockchain at pre-defined intervals. A method adapted to authenticate individual digital images has been proposed in [4]—it includes storing a hash value in a blockchain to create a timestamped digital record. Furthermore, the proposal in [1] was developed for a marketable cryptocurrency (Bitcoin) that requires proof-of-work. Given the current exchange rates of currencies such as Bitcoin, it is rather expensive to use such solution for example for surveillance cameras—not only would the price of proving the authenticity of the video soon exceed the cost of the camera, but the camera also needs to be re-supplied with coins, which needs to be done in small increments such that it would not become a target for thieves. Improvements suggested in [2], e.g. the aggregation of the transactions on 24 hour batches and submitting them in one aggregate transaction on the blockchain would address some of the cost issues but at the same time would not be applicable to real-time transmissions. Solutions such as [3] and [4] depend on a blockchain, which require proof of work therefore have a high computational overhead and low limits associated with storing data in the blockchain.

In the solutions explained above which are used in the area of digital content verification and tamper detection, none of them cover trusted computing—e.g. in case the device originating the video is compromised and the hash value is intercepted before being stored in the blockchain, an attacker could replace this value with a wanted value for a modified video and register the modified copy as the untampered original video. So, there is need to identify a solution to enable trusted computing in a decentralized manner, thus making it more difficult for attackers to register tampered versions.

SUMMARY

It is an object of the invention to address at least some of the limitations, problems and issues outlined above. More specifically, it is an object of the invention to create tamper-evident digital content and detect tampering of digital content using it.

These and other objects of the invention are achieved by means of different aspects of the invention, as defined by the independent claims. Embodiments of the invention are characterized by the dependent claims.

According to a first embodiment, a method for creating a tamper-evident digital content is provided. The method comprises the steps of receiving a portion of the digital content at a computing device; encrypting the portion of the digital content by the computing device when the portion of the digital content is selected for proof-of-verification; sending the encrypted portion of the digital content from the computing device to a distributed ledger system; retrieving, by the computing device, hash identification data associated with the encrypted portion of the digital content from the distributed ledger system; and creating, by the computing device, an updated portion of the digital content using the retrieved hash identification data. The method may further comprise the step of storing the updated portion of the digital content in a storage device by the computing device.

The method may further comprise the steps of receiving one or more additional portions of the digital content at the computing device; encrypting one of the additional portions of the digital content by the computing device when that additional portion of the digital content is selected for proof-of-verification; sending the encrypted additional portion of the digital content from the computing device to the distributed ledger system; retrieving, by the computing device, hash identification data associated with the encrypted additional portion of the digital content from the distributed ledger system; and creating, by the computing device, an updated additional portion of the digital content using the retrieved hash identification data.

In some variants, the computing device is a media encoding device.

In some variants, the digital content comprises media data wherein the media data comprises media frames; and each said portion of the digital content comprises at least one media frame.

In some variants, the digital content comprises MPEG encoded data; and each said portion of the digital content comprises at least one MPEG I-frame.

In embodiments, creating the updated portion of the digital content may further comprise the step of embedding the retrieved hash identification data with metadata associated with the portion of the digital content.

In embodiments, determining if the portion of the digital content is to be selected for proof-of-verification may further comprise the step of using a predefined technique to determine if the first portion of the digital content is to be selected for proof-of-verification wherein the technique is any of: batch sampling technique or simple sampling technique.

In embodiments, sending the encrypted portion of the digital content may further comprise the steps of creating a hash value for the encrypted portion of the digital content received at the distributed ledger system wherein the hash value is created using a smart contract or a stored procedure in the distributed ledger; and storing the hash value in the distributed ledger system wherein storing the hash value in the distributed ledger system comprises storing the hash value in at least one of the data storage units of the distributed ledger system.

In embodiments, the hash identification data associated with the encrypted first portion of the digital content may further comprise at least a location identifier of the uploaded first hash value; and a type information of the distributed ledger system.

Embodiments of the first aspect may work with real-time digital content streams (e.g., real-time video) as well as regular files. Embodiments may also utilize real-time encrypting, hashing and uploading, which may contribute to a high level of integrity of the uploaded hashes. Embodiments may also utilize immutable databases together with smart contracts, which may also contribute to a high level of integrity of the uploaded hashes According to second embodiment, a method for detecting tampering of a digital content is provided. The method comprises the steps of receiving a portion of the digital content at the computing device; encrypting the portion of the digital content by the computing device when the portion of the digital content contains proof-of-verification; computing a first hash value for the encrypted portion of the digital content by the computing device; comparing the computed first hash value with a second hash value associated with the portion of the digital content in the computing device, wherein the second hash value is obtained by the computing device from a distributed ledger system; and identifying the evidence of tampering of the digital content when the computed first hash value is not equal to the second hash value. The method may further comprise the step of providing an alert message to a user or an output medium upon detecting tampering of the digital content.

The method may further comprise the steps of receiving one or more additional portions of the digital content at the computing device; encrypting one of the additional portions of the digital content by the computing device when that additional portion of the digital content contains proof-of-verification; computing a first hash value for the encrypted additional portion of the digital content by the computing device; comparing the computed first hash value with a second hash value associated with the additional portion of the digital content in the computing device, wherein the second hash value is obtained by the computing device from the distributed ledger system; and identifying the evidence of tampering of the digital content when the computed first hash value is not equal to the second hash value.

In some variants, the computing device is a media decoding device.

In some variants, the digital content comprises media data wherein the media data comprises media frames; and each said portion of the digital content comprises at least one media frame.

In some variants, the digital content comprises MPEG encoded data; and each said portion of the digital content comprises at least one MPEG I-frame.

In embodiments, determining if the portion of the digital content contains proof-of-verification may further comprise the steps of retrieving metadata information associated with the portion of the digital content; and verifying the retrieved metadata to identify whether the portion of the digital content contains proof-of-verification.

In embodiments, the second hash value associated with the portion of the digital content is obtained from the distributed ledger system using the metadata information associated with the portion of the digital content.

In some variants, the encrypting may be done using either a symmetric cryptography or an asymmetric cryptography.

In some variants, the distributed ledger system may be a block chain or a database.

According to third embodiment, a computing device for creating a tamper-evident digital content is provided. The computing device comprises: one or more processing circuits; at least one communication interface for communicating with a distributed ledger system and a storage device; and an encoding unit. The encoding unit is configured to: receive a portion of the digital content at the computing device; encrypt the portion of the digital content by the computing device when the portion of the digital content is selected for proof-of-verification; send the encrypted portion of the digital content from the computing device to the distributed ledger system; retrieve hash identification data associated with the encrypted portion of the digital content from the distributed ledger system; and create an updated portion of the digital content using the retrieved hash identification data. The encoding unit may be further configured to store the updated portion of the digital content in the storage device.

The encoding unit may be further configured to: receive one or more additional portions of the digital content at the computing device; encrypt one of the additional portions of the digital content by the computing device when that additional portion of the digital content is selected for proof-of-verification; send the encrypted additional portion of the digital content from the computing device to the distributed ledger system; retrieve hash identification data associated with the encrypted additional portion of the digital content from the distributed ledger system; and create an updated additional portion of the digital content using the retrieved hash identification data.

In embodiments, the computing device may be a media encoding device.

According to a fourth embodiment, a computing device for creating a tamper-evident digital content is provided. The computing device comprises: one or more processing circuits; at least one communication interface for communicating with a distributed ledger system, an output medium or a user; and a decoding unit. The decoding unit is configured to: receive a portion of the digital content at the computing device; encrypt the portion of the digital content by the computing device when the portion of the digital content contains proof-of-verification; compute a first hash value for the encrypted portion of the digital content by the computing device; compare the computed first hash value with a second hash value associated with the portion of the digital content in the computing device, wherein the second hash value is obtained by the computing device from the distributed ledger system; and identify the evidence of tampering of the digital content when the computed first hash value is not equal to the second hash value. The decoding unit may be further configured to provide an alert message to a user or an output medium upon detecting tampering of the digital content.

The decoding unit may further configured to: receive one or more additional portions of the digital content at the computing device; encrypt one of the additional portions of the digital content by the computing device when that additional portion of the digital content contains proof-of-verification; compute a first hash value for the encrypted additional portion of the digital content by the computing device; compare the computed first hash value with a second hash value associated with the additional portion of the digital content in the computing device, wherein the second hash value is obtained by the computing device from the distributed ledger system; and identify the evidence of tampering of the digital content when the computed first hash value is not equal to the second hash value.

In embodiments, the computing device may be a media decoding device.

According to fifth embodiment, a computer program product which comprises an embodiment of a computer program according to the first aspect and a computer readable means on which the computer program is stored.

According to sixth embodiment, a computer program product which comprises an embodiment of a computer program according to the second aspect and a computer readable means on which the computer program is stored.

Embodiments allow a user to verify whether a digital content (for e.g. a video) is taken out of context, out of place, or if the digital content (e.g. video) has been tampered with, and provide a user with a tool to test if the digital content (e.g. video) is trustable.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

Further possible features and benefits of this solution will become apparent from the detailed description below.

BRIEF DESCRIPTION OF THE DRAWINGS

The invention will now be described in more detail by means of some example embodiments and with reference to the accompanying drawings, in which.

DETAILED DESCRIPTION

The invention will now be described more fully hereinafter with reference to the accompanying drawings, in which certain embodiments of the invention are shown. However, other embodiments in many different forms are possible within the scope of the present disclosure. Rather, the following embodiments are provided by way of example so that this disclosure will be thorough and complete. Like numbers refer to like elements throughout the description.

More and more mobile phones, tablets, laptop computers, and other portable devices are being equipped with cameras, internet connections, GPS, and various other sensors and accessories. The increasing capabilities of today's smartphones enable the end user to produce and distribute digital content more easily than before. Video, for example, may be taken nearly anywhere, uploaded, and consumed by others in locations remote from the site of the content creation. One issue that has arisen from this is the lack of ability to identify whether the digital content (e.g., video) has been falsified, altered, doctored, modified, and/or forged as compared to the originally created digital content. It is getting increasingly difficult for the viewer to know what to believe, who to believe, and the tools to help counter these issues are scarce and limited. There is a need to identify whether any tampering was done to the original digital content. The ability to detect any tampering with digital content may be important, for example, to protect individuals or businesses from deceptively edited video, to allow the public to have confidence in videos of public significance (e.g., news events, politics, and so on), and numerous other examples.

Figure 1A:
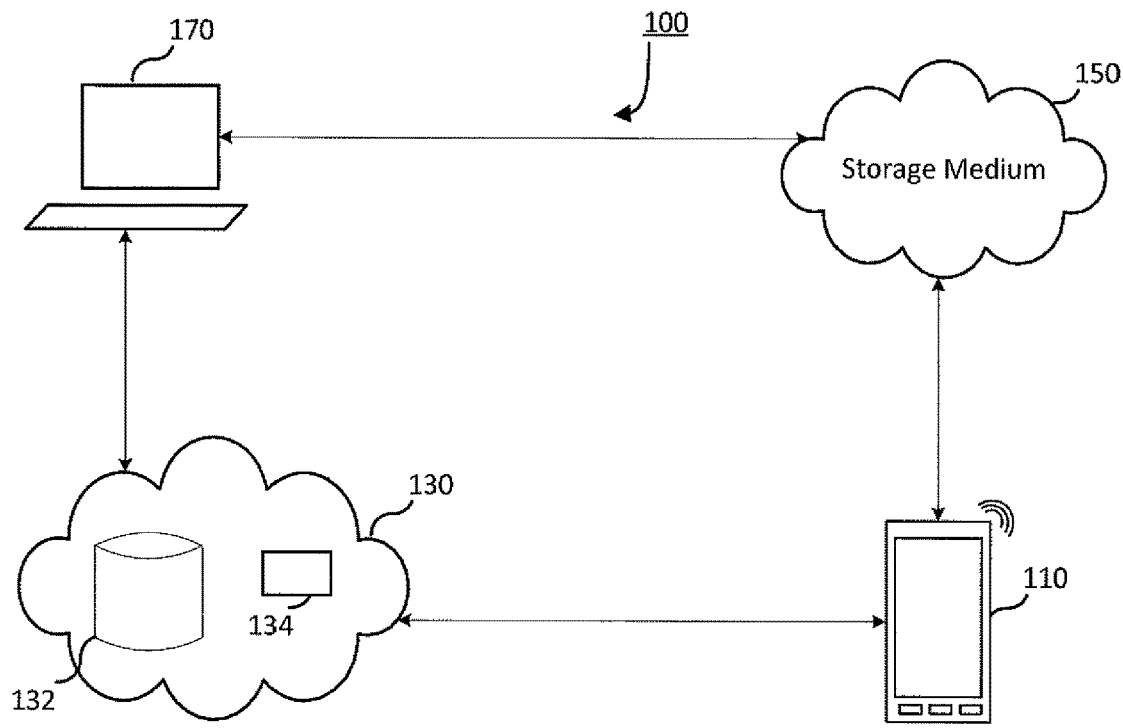
FIG. 1a is a schematic block diagram of an environment where the embodiments presented herein may be applied.

Tampering involves the deliberate altering or meddling of the digital content. Tamper-evident describes a device or process or technique that makes unauthorized access or alteration done to the protected object easily detected. Tamper-evident digital content are generally used to detect any unauthorized access or deliberate altering to the digital content and ascertain whether the digital content was altered or not after its creation. Thus, a tamper-evident digital content typically guarantees that any physical or software tampering that can alter the behavior of a digital content is detected. In some variants of tamper-evident digital content cryptographic hash functions and cryptographic signatures are used to add a tamper-evident layer of protection to digital content. In FIG. 1a a schematic block diagram of an environment 100 where the invention presented herein may be applied is illustrated. The environment 100 comprises an input computing device 110 (hereafter referred as "input device") which is typically a digital content-creation device such as a smartphone, tablet, personal computer, and so forth. The input device 110 may also receive digital content from external resources. The digital content created or received by the input device 110 is processed by an encoding unit. The encoding unit could be present locally on the input device 110 or externally on other devices and/or servers (e.g., a trusted server containing the encoding unit receiving data in real-time from input device 110).

On receiving a portion of the digital content at the input device 110, the encoder unit using any of the configured sampling techniques, such as batch sampling technique or simple sampling technique, identifies whether the portion of the digital content is selected for proof-of-verification. All portions of the digital content received by the encoder unit of the input device 110 are not used for creating the tamper-evident digital content. So, identifying whether the portion of the digital content is selected for proof-of-verification means to determine whether the received portion of the digital content should be stored as part of the proof (after certain processing as explained in the below steps) on the distributed ledger system or not, while creating the tamper-evident digital content.

If the portion of the digital content is selected for proof-of-verification then the encoding unit encrypts the portion of the digital content using the encryption keys preconfigured in it. Generally, the purpose of encryption is to protect digital data confidentiality as it is stored on computer systems and transmitted using the internet or other computer networks. Encryption is the process of encoding a message or information in such a way that only authorized parties can access it. Data encryption translates data into another form, or code, so that only entities with access to a secret key or password can read it. Encrypted data is commonly referred to as ciphertext, while unencrypted data is called plaintext. Data is encrypted with an encryption algorithm and an encryption key to create ciphertext, which can be viewed in its original form only if it is decrypted with the correct key. Encryption algorithms provide confidentiality of message and guarantee the authentication and integrity of a message. Authentication allows for the verification of a message's origin, and integrity provides proof that a message's contents have not changed since it was sent. Two main types of data encryption exist—asymmetric encryption, also known as public-key encryption, and symmetric encryption, also known as private-key encryption. Symmetric-key cryptography uses the same secret key for encrypting and decrypting a message or file. An asymmetric cryptography uses two different keys, one public and one private. The public key, as it is named, may be shared with everyone, but the private key must be protected. The Rivest-Sharmir-Adleman (RSA) algorithm is a cryptosystem for public-key encryption that is widely used to secure sensitive data, especially when it is sent over an insecure network like the internet.

The encrypted portion of the digital content is then sent from the input device 110 to a distributed ledger system 130 for further processing and storage. A distributed ledger is a database that is consensually replicated, shared and synchronized across network geographically spread across multiple sites, institutions or countries. It can be described as a ledger of any transactions or contracts maintained in decentralized form across different locations and people, eliminating the need of a central authority to keep a check against manipulation. The participant at each node of the network can access the recordings shared across that network and can own an identical copy of it. Further, any changes or additions made to the ledger are reflected and copied to all participants in a matter of seconds or minutes. All the information on it is securely and accurately stored using cryptography and can be accessed using keys and cryptographic signatures. Once the information is stored, it becomes an immutable database and is governed by the rules of the network. The distributed ledgers are inherently harder to attack because instead of a single database, there are multiple shared copies of the same database, so a cyber-attack would have to attack all the copies simultaneously to be successful.

The distributed ledger system 130 may have more than one data storage unit implemented as blockchain databases or distributed databases. One form of distributed ledger system 130 implementation is the blockchain system, which can be either public or private. Another variant of distributed ledger system 130 implementation is using a trusted database system. The distributed ledger system 130 if implemented as a blockchain ledger, it may also include distributed blockchain databases 132 and smart contracts 134. The distributed ledger system 130 if implemented as a trusted database system, it may also include a database 132 and stored procedures 134. Distributed ledger system 130, blockchain ledger 132 and smart contract 134 may be immutable, i.e. data is not modified after being written, so that data is not changed (a/k/a mutated) after being loaded into database. A smart contract 134 operating with blockchain ledger 132 would hash the encrypted portion of the digital content received from the input device 110 and then store the hashed data in the blockchain ledger 130. In a trusted database 130, a stored procedure 134 operating with database 132 would hash the encrypted portion of the digital content received from the input device 110 and then store the hashed data in the trusted database 130. The hash value generated is stored in at least one of the data storage units 132 of the distributed ledger system 130.

For example, by using a lightweight blockchain infrastructure based on a proof-of-stake or proof-of-authority algorithm or alternately on directed acyclic graphs, the solution provides the advantage of low-overhead and high transaction rate support during real-time video broadcasting. It enables to perform trusted computing in a decentralized manner, thus making it more difficult for attackers or hackers to register tampered versions of the digital content as an original version as no central repository exists. The use of a private blockchain removes the need to re-supply digital currencies to the content creation devices, thus improving the security of the owners. Furthermore, a lightweight proof of work or proof of stake may allow the content creation device itself to validate transactions and execute smart contracts because of the low demands on computational resources.

Generally, the hashing of data is used to guarantee the integrity and authentication of a message and uniquely represent the data. Hashing is the process of producing hash values for the purpose of accessing data and for security reasons in communication systems. An important characteristic about a hash value is that it is nearly impossible to derive the original input number without knowing the data used to create the hash value Hashing with regard to security is the technique of taking data, encrypting it, and creating unpredictable, irreversible output. Hashing will take arbitrary input and produce a string with a fixed length. Typically hashing techniques will have the following attributes:
   (i) A given known input must always produce one known output;
   (ii) Once hashing has been done, it should be impossible to go from the output to the input;
   (iii) Different multiple inputs should give a different output;
   (iv) Modifying an input should mean a change in the hash.
Message Digest 2 (MD2), Message Digest 6 (MD6), Secure Hash Algorithm (SHA), Hashed Message Authentication Code (HMAC) etc. are examples of hashing techniques.

After the hash value of the encrypted portion of the digital content is stored in the distributed ledger system 130, the input device 110 through the encoding unit then retrieves the hash identification data associated with the encrypted portion of the digital content from the distributed ledger system 130. The hash identification data may comprise at least a location identifier of the uploaded hash value in the distributed ledger system 130; and a type information of the distributed ledger system. The location identifier may be a blockchain identifier i.e. a blockchain-specific address associated to the hash value of the encrypted portion of the digital content. Generally, new location identifiers are assigned for each encrypted portion of the digital content stored in the distributed ledger system 130. The type information of the distributed ledger system 130 may be the network-reachable address of the lightweight chain infrastructure i.e. the distributed ledger system 130 with which the input device 110 is linked with for storing the digital content. The type information could be provided as an HTTP address, IP address and port number, or any other identifier that is reachable over a communication network.

After retrieving the hash identification data associated with the encrypted portion of the digital content from the distributed ledger system 130, the encoding unit creates an updated portion of the digital content by the embedding the retrieved hash identification data with metadata associated with the portion of the digital content. The created updated portion of the digital content is then uploaded to a storage medium 150. The storage medium 150 could be database or a content distribution network (CDN). For example, video content may be uploaded to CDN, a social media site, distributed as live media, or otherwise shared with users.

The solution may support real-time digital content (e.g. video) transmission by calculating the hash values online, and performing the distributed ledger transactions while the digital content is being transmitted.

The digital content together with its associated metadata may then be accessed by an end user on an output computing device 170 (hereafter referred as "output device") from the storage medium 150 (e.g., database, social media platform or content distribution system etc.), and identification of evidence of tampering is done using a decoding unit. The decoding unit could be either executing internally within the output device 170 e.g., through the web client on the output device 170 or the decoding unit could be executing external to the output device 170 e.g., a trusted server containing the decoding unit receiving digital content together with its associated metadata in real-time from the storage medium 150.

The decoding unit essentially mirrors most of the process performed for the tamper-evident digital data creation on receiving the content at the input device 110 (e.g., as performed by the encoding unit on the input device 110). Because verification mirrors most of the process performed during the time of tamper-evident digital data creation, the decoding unit may need to know certain parameters that were used to encrypt the digital content, hash the encrypted digital content and associated metadata. As one example, one parameter may be to identify the encrypting function or functions to be used (e.g. asymmetric or symmetric cryptographic keys). Another example, one parameter may be to identify the hashing function or functions to be used (e.g., SHA-256, MD6, Pearson hashing, Fletcher checksum). Another example may be to identify the technique used for selecting the digital content for the proof-of verification (e.g. simple sampling or batch sampling). These parameters may be configured on the decoding unit, provided to the decoding unit by the user, provided to the decoding unit as part of the metadata, or otherwise known to the decoding unit. By embedding the above mentioned requisite parameters/identifiers in the metadata of the digital content (e.g. video), the solution enables the automation of the tamper detection process without any human intervention.

The detection of tampering verification by the output device 170 involves communication with the distributed ledger system 130 (e.g., to receive verification data such as hash value by which the digital content may be verified for tampering). The decoding unit on the output device 170 may be connected to the distributed ledger system 130. To verify the digital content, the digital content containing the associated metadata is provided to the decoding unit (e.g., via the storage medium 150).

The decoding unit on receiving a portion of the digital content containing the associated metadata retrieves the metadata associated with the portion of the digital content. The decoding unit on receiving the digital content may involve communication with the distributed ledger system 130 (e.g., to receive hash data by which the digital content may be verified for tampering). Using the retrieved metadata information it identifies whether the portion of the digital content contains proof-of-verification. If the digital content contains or was selected for proof-of-verification then the decoding unit retrieves the hash value associated with the portion of the digital content from the distributed ledger system 130. During the tamper detection process, the decoding unit encrypts the portion of the digital content and creates a hash value of the encrypted portion of the digital content. The decoding unit then compares the newly created hash value of the encrypted portion of the digital content with the hash value retrieved from the distributed ledger system 130. If the newly created hash value is not equal to the retrieved hash value then evidence of tampering is detected. If evidence of tampering of the digital content is identified then the decoding unit provides an alert message to an external user through the output device 170. If the newly created hash value is equal to the retrieved hash value then no tampering is detected. The output device 170 such as a smartphone, tablet, personal computer, and so forth renders the digital content if no tampering is detected by the decoding unit.

Figure 1B:
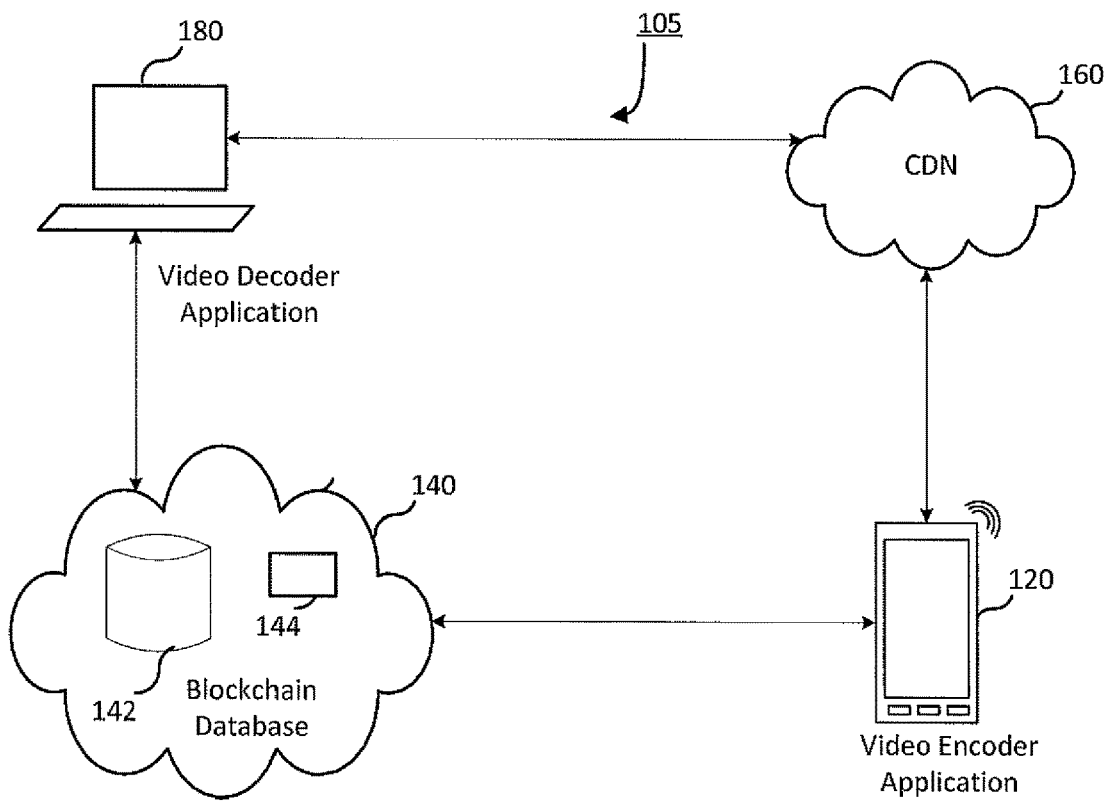
FIG. 1b is a schematic illustration of an environment where the embodiments presented herein may be applied.

In FIG. 1b, a schematic illustration of an environment 105 in which the embodiments presented herein may be applied is shown. The environment 105 shown in FIG. 1b provides a sample illustration of the implementation of the environment 100 explained above with reference to FIG. 1a.

The video encoder application 120 (hereafter referred as "encoder") corresponds to the input device 110 in the environment 100. The encoder 120 is a content-creation device for creating the digital content i.e. the video content in this illustration. The encoder 120 captures and transmits video. The encoder 120 can be a video camera (for example it could be a smartphone camera, video recorder, car dashboard camera or surveillance camera, and so forth). The encoder 120 comprises an encoding unit which is present locally on the encoder 120 in this illustration.

The blockchain database 140 (hereafter referred as "blockchain") corresponds to the distributed ledger system 130 in the environment 100. The blockchain 140 is of lightweight blockchain infrastructure which could be either public blockchain or private blockchain. A public blockchain infrastructure is a blockchain where the nodes 142 that maintain the consensus belong to many administrative domains that have no agreements between them. Example: Ethereum, NEO, IOTA etc. A private blockchain infrastructure is a blockchain where the nodes 142 that maintain the consensus belong to one administrative domain, or to several administrative domains that have well-defined agreements regarding the blockchain infrastructure. Example: Hyperledger community software deployed within an enterprise, a consortium of enterprises or as-a-Service. A smart contract 144 is deployed in the blockchain 140. Typically, the smart contract 144 cannot perform extensive computational tasks; therefore, its functionality is limited to computing hash values, using cryptographic functions such as SHA-256 etc. The usage of lightweight blockchain infrastructure enables the entire solution to be highly scalable by design. The lightweight blockchain infrastructure typically uses a proof-of-stake technique or a directed acyclic transaction graph with a lightweight proof-of-work and a short time-wise block size, thus enabling the solution to have fast transaction times and high transaction frequency.

The content distribution network (CDN) such as CDN 160 corresponds to the storage medium 150 in the environment 100. For example, video content may be uploaded to CDN 160, a social media site, or distributed as live media etc.

The video decoder application 180 (hereafter referred as "decoder") corresponds to the output device 170 in the environment 100. The decoder 180 is a content-verification and display device for verifying the digital content i.e. the video content for tampering in this illustration. The decoder 180 receives the video and identifies if tampering is done with respect to the original video. The decoder 180 may be any device that renders the video content for visualization, the decoder 180 may be executed in any platform that allows for visually presenting video frames (for example it could be a smartphone, tablet, personal computer, video display unit and so forth). The decoder 180 comprises a decoding unit which is present locally on the decoder 180 in this illustration.

Figure 4:
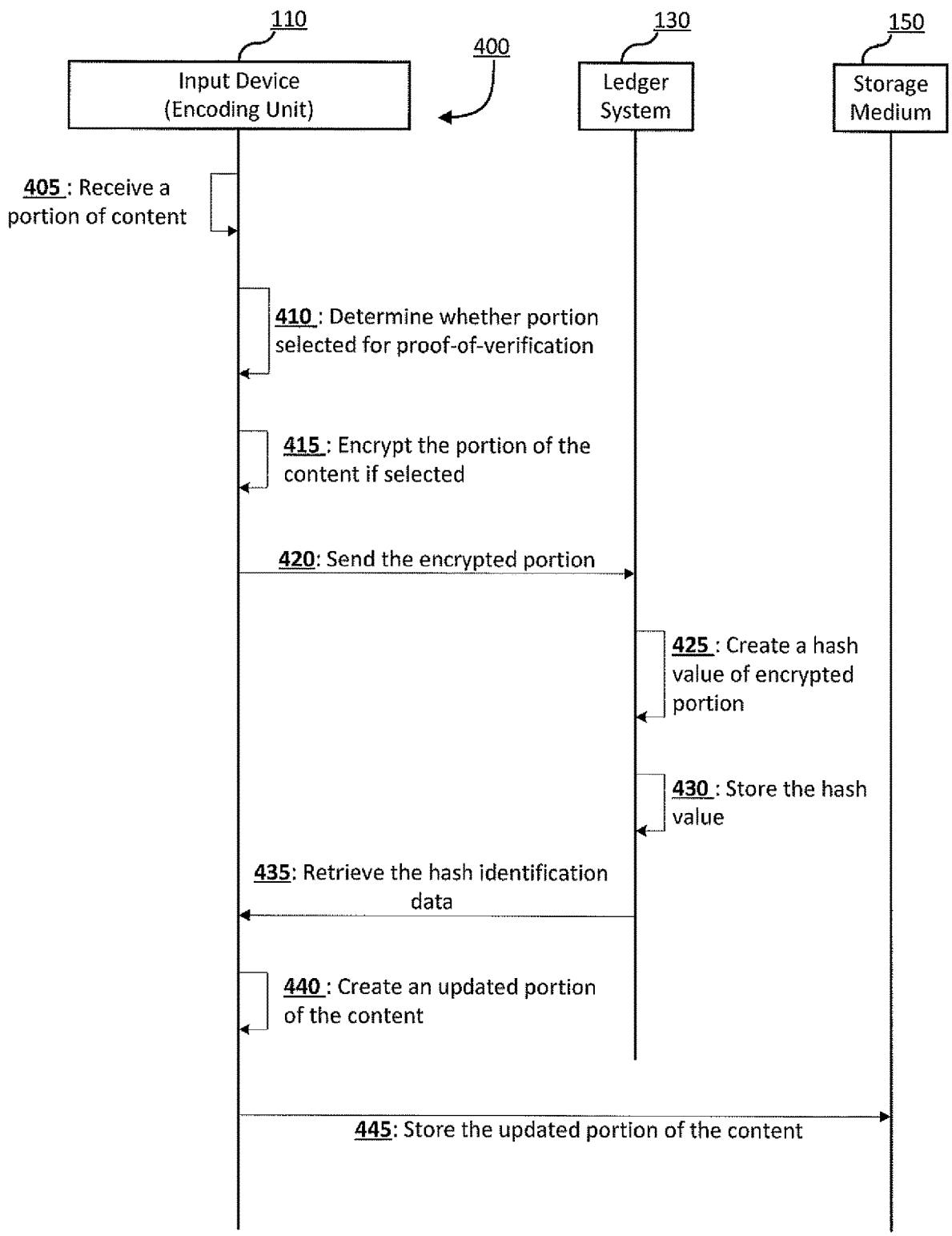
FIG. 4 is a schematic sequence diagram of a method for creating a tamper-evident digital content in accordance with some embodiments of the invention.

In FIG. 4, a schematic sequence diagram of a method 400 for creating a tamper-evident digital content in accordance with an embodiment of the invention is illustrated. The method 400 implements the input device 110, the distributed ledger system 130 and the storage medium 150 described above with reference to FIG. 1

The method in FIG. 4 comprises the steps of the encoding unit on the input device 110 receiving (step 405) a portion of the digital content. The method further comprises the encoding unit on the input device 110 determining (step 410) whether the portion of the digital content is to be selected for proof-of-verification. After determining, when the portion of the digital content is selected for proof-of-verification, the method further comprises, the encoding unit on the input device 110 encrypting (step 415) the portion of the digital content. The method further comprises, the encoding unit on the input device 110 sending (step 420) the encrypted portion of the digital content to a distributed ledger system 130.

On receiving the encrypted portion of the digital content at the distributed ledger system 130 from the input device 110 the method further comprises, the steps of creating (step 425) a hash value for the encrypted portion of the digital content received at the distributed ledger system 130 wherein the hash value is created using a smart contract 134 or a stored procedure 134 in the distributed ledger system 130. The hash value created is then stored (step 430) in the distributed ledger system wherein storing the hash value in the distributed ledger system comprises storing the hash value in at least one of the data storage units 132 of the distributed ledger system 130.

After sending the encrypted portion of the digital content, the method further comprises the encoding unit on the input device 110 retrieving (step 435) the hash identification data associated with the encrypted portion of the digital content from the distributed ledger system 130. After retrieving the hash identification data, the method further comprises, the encoding unit on the input device 110 creating (step 440) an updated portion of the digital content using the retrieved hash identification data. The method further comprises the step of the encoding unit on the input device 110 storing (step 445) the updated portion of the digital content in a storage medium 150.

Figure 6:
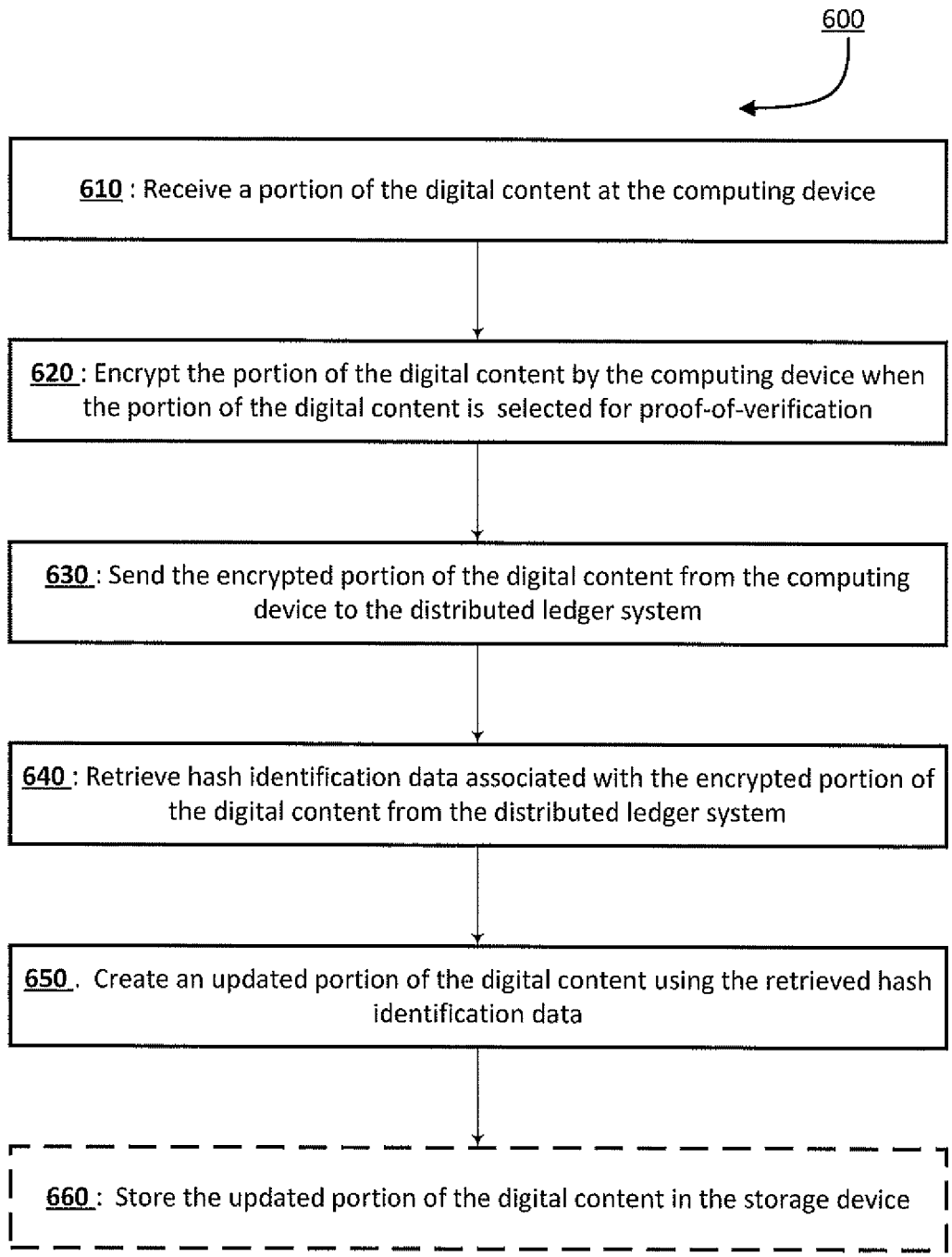
FIG. 6 is a schematic flowchart in accordance with some embodiments of the invention.
Figure 8:
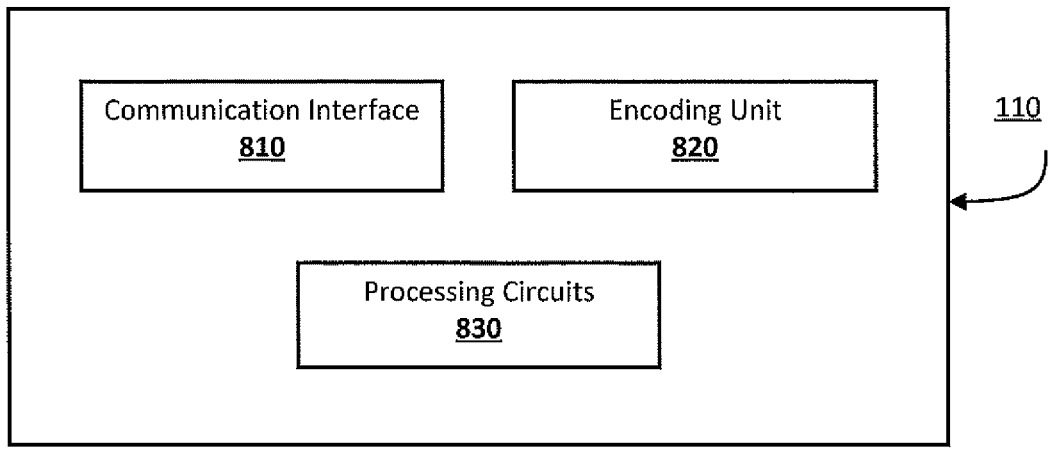
FIG. 8 is a schematic block diagram of a computing device for creating a tamper-evident digital content, in accordance with an embodiment of the invention.

In FIG. 8, a schematic block diagram of a computing device 110 for creating a tamper-evident digital content in accordance with method 600 in FIG. 6. The computing device 110 is typically implemented as a content creation device i.e. the input device 110 which comprises an encoding unit, wherein the encoding device could be present locally on the input device 110 or externally on other devices and/or servers as described above with reference to FIG. 1. The computing device 110 for creating a tamper-evident digital content may comprise:

one or more processing circuits 830;
at least one communication interface 810 which is for facilitating the communication with a distributed ledger system 130 and a storage device/medium 150 in the environment 100; and
an encoding unit 820 is typically configured to perform the different processing functions of the computing device 110

Figure 2:
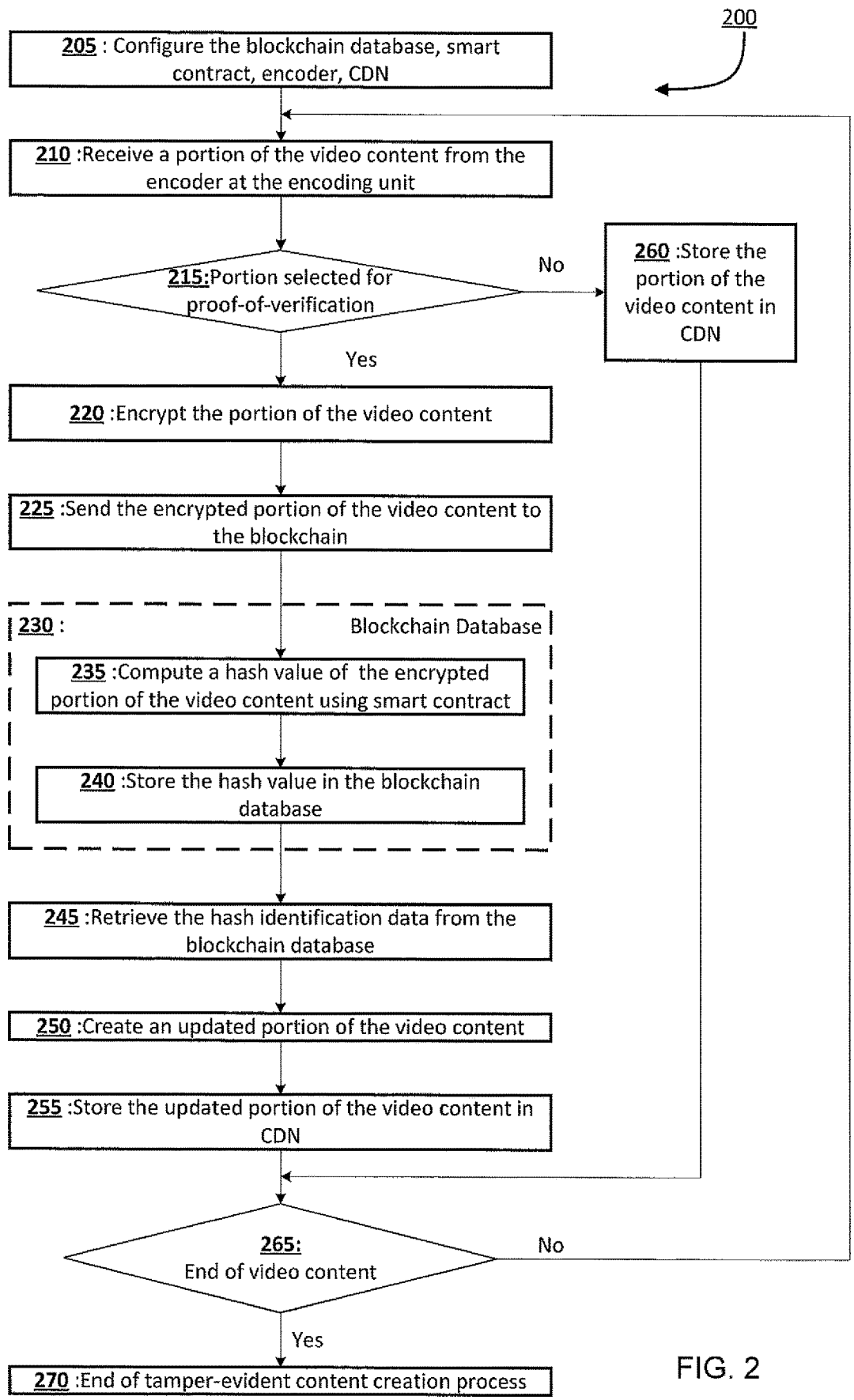
FIG. 2 is a schematic flowchart in accordance with some embodiments of the invention.

Using the environment 105 (illustrated in FIG. 1b and explained above) and the schematic flowchart 200 (illustrated in FIG. 2), along with reference to the environment 100 (as shown in FIG. 1a and explained above) and the input device 110 (as shown in FIG. 8 and explained above), an example of an implementation of the above method 400 (as shown in FIG. 4 and explained above) for creating a tamper-evident digital content will now be described.

The encoder 120 shown in the environment 105 which is implemented as an input device 110 in the environment 100 (as described above with reference to FIG. 1) may comprise at least one communication interface 810, one or more processing circuits 830 and an encoding unit 820 (as described above with reference to FIG. 8).

As part of the initialization process, the different systems in the environment 105 such as the blockchain 140, the smart contract 144, the encoder 120, and the CDN 160 may be configured (Step 205) initially with the requisite parameters. For example, the address of block chain 140, the address of smart contract 144, the address of CDN 160, the type of encryption and the encryption key used for encryption, the technique used for proof-of-verification, etc. may be pre-configured in the encoder 120.

For example let us consider the scenario wherein, the encoder 120 is a video camera which is recording a video. One or more video frames which form a portion of the video content is received (Step 210) at the encoding unit from the encoder 120.

For each portion of the video content received, the encoding unit needs to determine (Step 215) whether the portion of the video content needs to be selected for proof-of-verification. If the portion of the video content is to be selected for proof-of-verification then the portion of the video content should be stored as proof on the blockchain 140. There are many techniques available to determine whether the portion of the video content is to be selected for proof-of-verification, and some examples in this respect are:

Simple sampling, wherein every $N^{th}$ frame is selected (where N is either pre-configured as an arbitrary constant, or determined at run-time using a formula provided by the user of the encoder 120)

Batch sampling, wherein M frames are selected for every N frames (where M and N are either pre-configured as arbitrary constants, or determined at run-time using a formula provided by the user of the encoder 120)

A pre-learned machine learning or artificial intelligence model is used to identify significant changes in the video frame according to a criteria provided by the user of the encoder 120.

If the portion of the video content is selected for proof-of-verification then the one or more frames selected from the portion of the video content are encrypted (Step 220) by the encoding unit using the encryption keys preconfigured in encoder 120. The encryption is done to preserve the privacy or secrecy of the video content. The encryption may be done using symmetric or asymmetric encryption as configured by the user of the encoder 120.

After the selected portion of the video content is encrypted by the encoding unit, the encrypted portion of the video content is sent (Step 225) by the encoder 120 to the address of the smart contract 144 deployed in the blockchain 140. The smart contract 144 typically cannot perform extensive computational tasks by itself; therefore, its functionality is limited to computing (Step 235) a hash value on the received encrypted portion of the video content, using a cryptographic function such as SHA-256, and store (Step 240) the obtained hash value in the blockchain 140 along with the blockchain specific address associated with the encrypted portion of the video content. After the computed hash value and the blockchain specific address are stored on the node 142 where the smart contract 144 was executed, the values are distributed to the other nodes 142 in the blockchain 140 for storage through the consensus protocol. The smart contract operating in the blockchain 140 may append a time-stamp to the values stored in the blockchain 140, thus enabling the proof of timestamp verification concept done using the blockchain databases. The solution also enables real-time video transmission by calculating online the hash values and performing the blockchain transactions while the video is being transmitted from the encoder 120.

The encoding unit in the encoder 120 then using the well-known blockchain traversing techniques retrieves (Step 245) from the blockchain 140 the hash identification data associated with the encrypted portion of the video content (encrypted video content which was sent to the smart contract in the previous step). The hash identification data associated with the encrypted portion of the video content may comprise at least a location identifier of the uploaded hash value in the blockchain 140 and a type information of the blockchain 140. Using the hash identification data retrieved from the blockchain 140, the encoding unit in the encoder 120 creates (Step 250) an updated portion of the video content. The encoding unit creates the updated portion of the video content by embedding the retrieved hash identification data with the metadata associated with the portion of the video content (video content which was selected for proof-of-verification in the previous step). The encoding unit during the creation of the updated portion of the video content may also include in the metadata fields an indication on which frame(s) of the portion of the video content were selected for proof-of-verification operation. Thus, the requisite information is embedded by the encoding unit in the metadata fields associated with the portion of the video content to create the updated portion of the video content. Typically, a potential place for this is the Program Element Descriptor Tags in the MPEG standard (tags 234-254 are currently available for such new descriptors). The information generally to be embedded in the metadata fields are:

type information of the blockchain 140 may be the network-reachable address of the lightweight blockchain infrastructure i.e. the blockchain 140 with which the encoder 120 is linked with for storing the video content. The type information could be provided as an HTTP address, IP address and port number, or any other identifier that is reachable over a communication network.

location identifier may be a blockchain identifier i.e. a blockchain-specific address associated to the hash value of the encrypted portion of the video content stored in the blockchain 140 and potentially new identifiers are assigned for each encrypted portion of the video content stored in the blockchain 140

The created updated portion of the video content is then sent by the encoder 120 to the CDN 160 and the updated portion of the video content is stored (Step 255) in the CDN 160.

In the abovementioned step of determining (Step 215) whether the portion of the video content needs to be selected for proof-of-verification, if the portion of the video content is not selected for proof-of-verification then the portion of the video content is sent (it is sent in the same form as it was received at the encoding unit) by the encoder 120 to the CDN 160. The portion of the video content is stored (Step 260) in the CDN 160.

After storing, either the updated portion of the video content (Step 255) or the initial received portion of the video content (Step 260) in the CDN 160, the encoding unit in the encoder 120 determines (Step 265) whether the end of the video content has been reached i.e. it checks if any more additional portions of the video content are available in the encoder 120. If more additional portions of the video content are available in the encoder 120, then the above mentioned steps (Step 210 to 265) are performed for each of the additional portions of the video content available in the encoder 120. So, the method 200, after receiving the initial portion of the video content (Step 210) at the encoding unit from the encoder 120 enters into a loop, during which the video content is processed until there is some indication that the end of the video content has been reached, e.g. an end-of-file (EOF) bit (loop at Step 210-265). If no further portions of the video content are available in the encoder 120, then the method 200 for creating a tamper-evident video content is ended.

Figure 5:
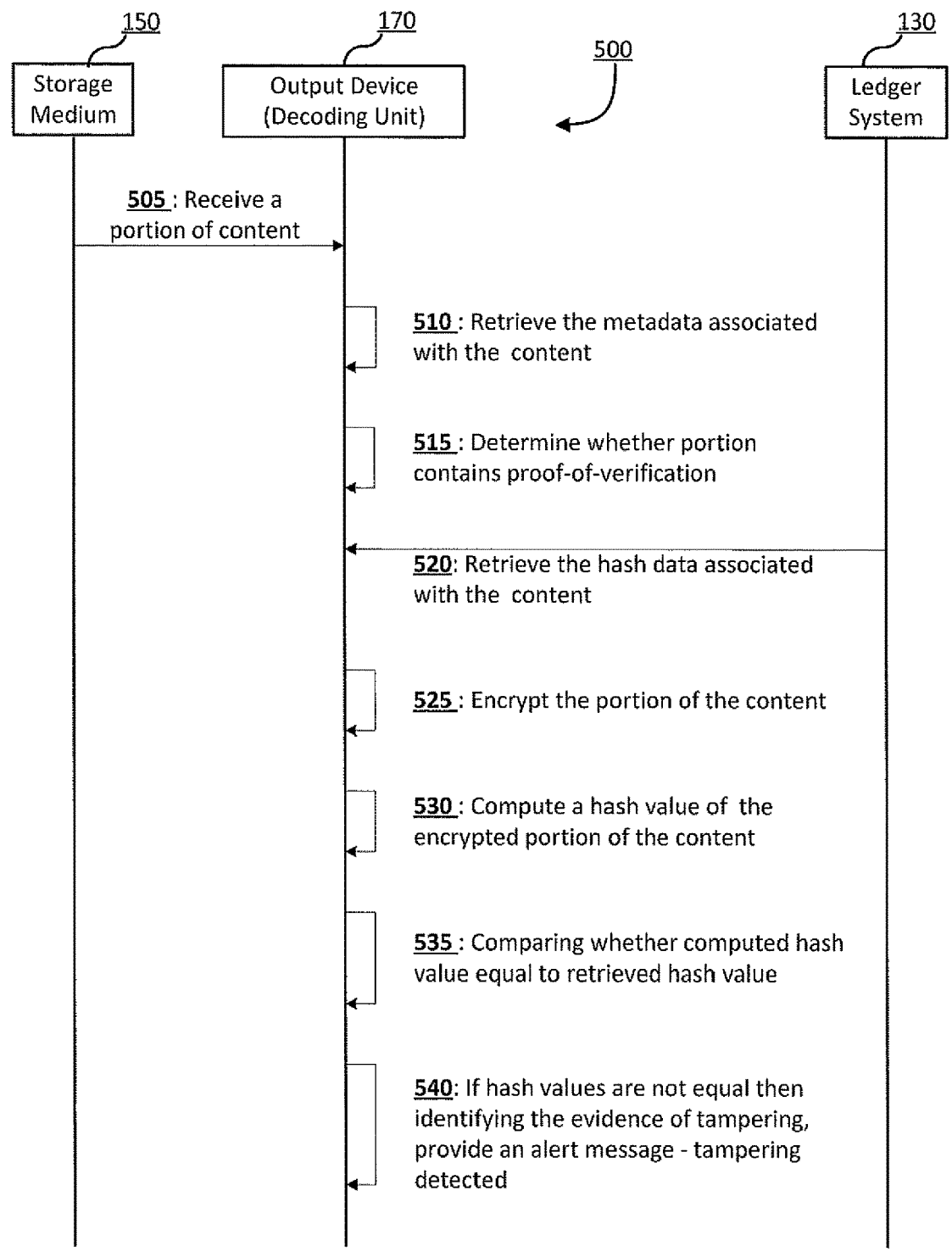
FIG. 5 is a schematic sequence diagram of a method for detecting tampering of a digital content in accordance with some embodiments of the invention.

In FIG. 5, a schematic sequence diagram of a method 500 for detecting tampering of a digital content in accordance with an embodiment of the invention is illustrated. The method 500 implements the output device 170, the distributed ledger system 130 and the storage medium 150 described above with reference to FIG. 1

The method in FIG. 5 comprises the steps of the decoding unit on the output device 170 receiving (step 505) a portion of the digital content from the storage medium 150. The method further comprises the decoding unit on the output device 170 retrieving (step 510) the metadata associated with the received portion of the digital content. The method further comprises the decoding unit on the output device 170 determining (step 515) whether the portion of the digital content contains proof-of-verification. After determining, when the portion of the digital content is selected for proof-of-verification, the decoding unit on the output device 170 retrieves (step 520) the hash value associated with the portion of the digital content from the distributed ledger system 130

The method further comprises, the decoding unit on the output device 170 encrypting (step 525) the portion of the digital content. After encrypting the portion of the digital content, the method further comprises, the decoding unit on the output device 170 computing (step 530) a hash value for the encrypted portion of the digital content. The method further comprises, the decoding unit on the output device 170 comparing 535 the computed hash value of the encrypted portion of the digital content with the retrieved hash value associated with the portion of the digital content. The method further comprises, when the computed hash value of the encrypted portion of the digital content is not equal to the retrieved hash value associated with the portion of the digital content then identifying (step 540) the evidence of tampering of the digital content and method may further comprise the step of providing an alert message to a user or an output medium about detecting tampering of the digital content.

Figure 7:
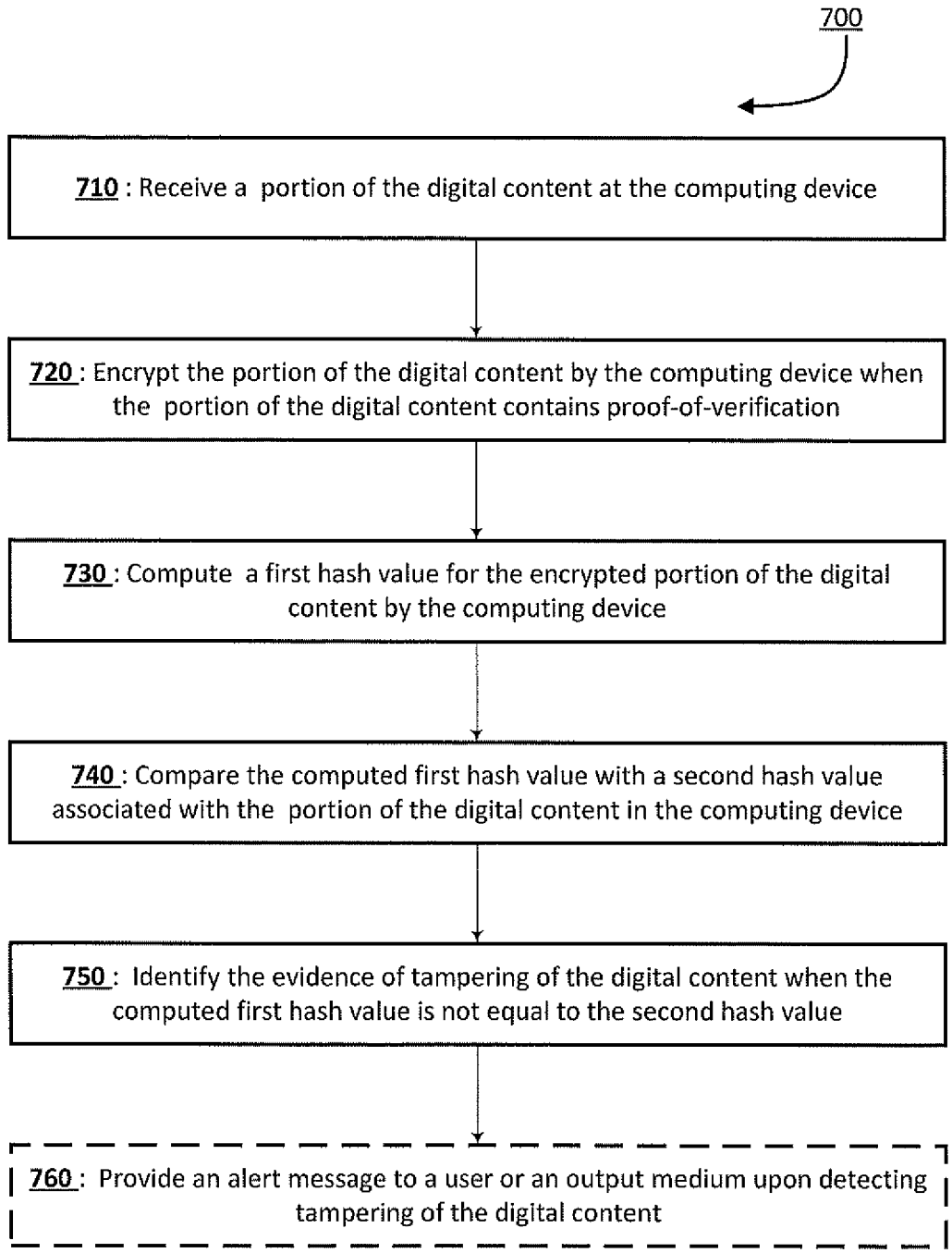
FIG. 7 is a schematic flowchart in accordance with some embodiments of the invention.
Figure 9:
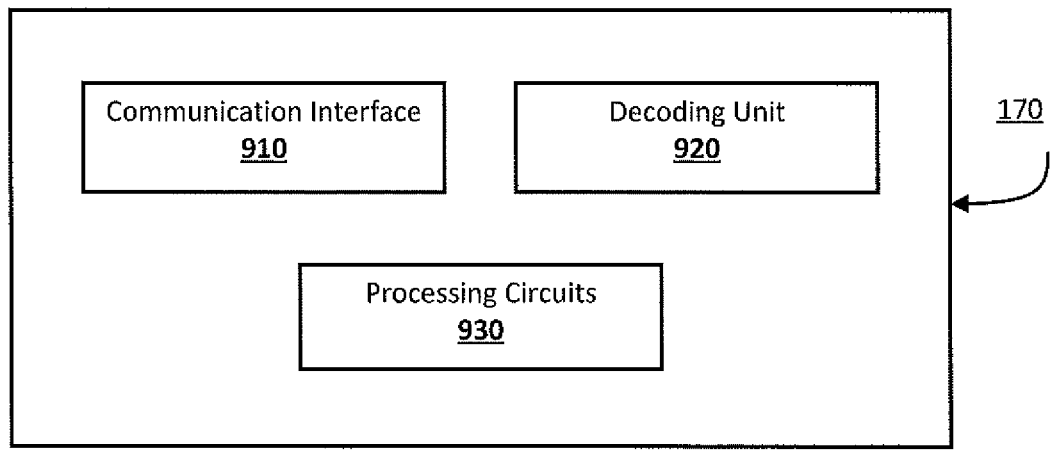
FIG. 9 is a schematic block diagram of a computing device for detecting tampering of a digital content, in accordance with an embodiment of the invention.

In FIG. 9, a schematic block diagram of a computing device 170 for detecting tampering of a digital content in accordance with in accordance with method 700 in FIG. 7. The computing device 170 is typically implemented as a content output/display device i.e. the output device 170 which comprises of a decoding unit, wherein the decoding unit which could be present locally on the output device 170 or externally on other devices and/or servers as described above with reference to FIG. 1. The computing device 900 for detecting tampering of a digital content may comprise:

one or more processing circuits 930;
at least one communication interface 910 which is for facilitating the communication with an output medium/device 170, a distributed ledger system 130 and a storage device/medium 150 in the environment 100; and
a decoding unit 920 is typically configured to perform the different processing functions of the computing device 170.

Figure 3:
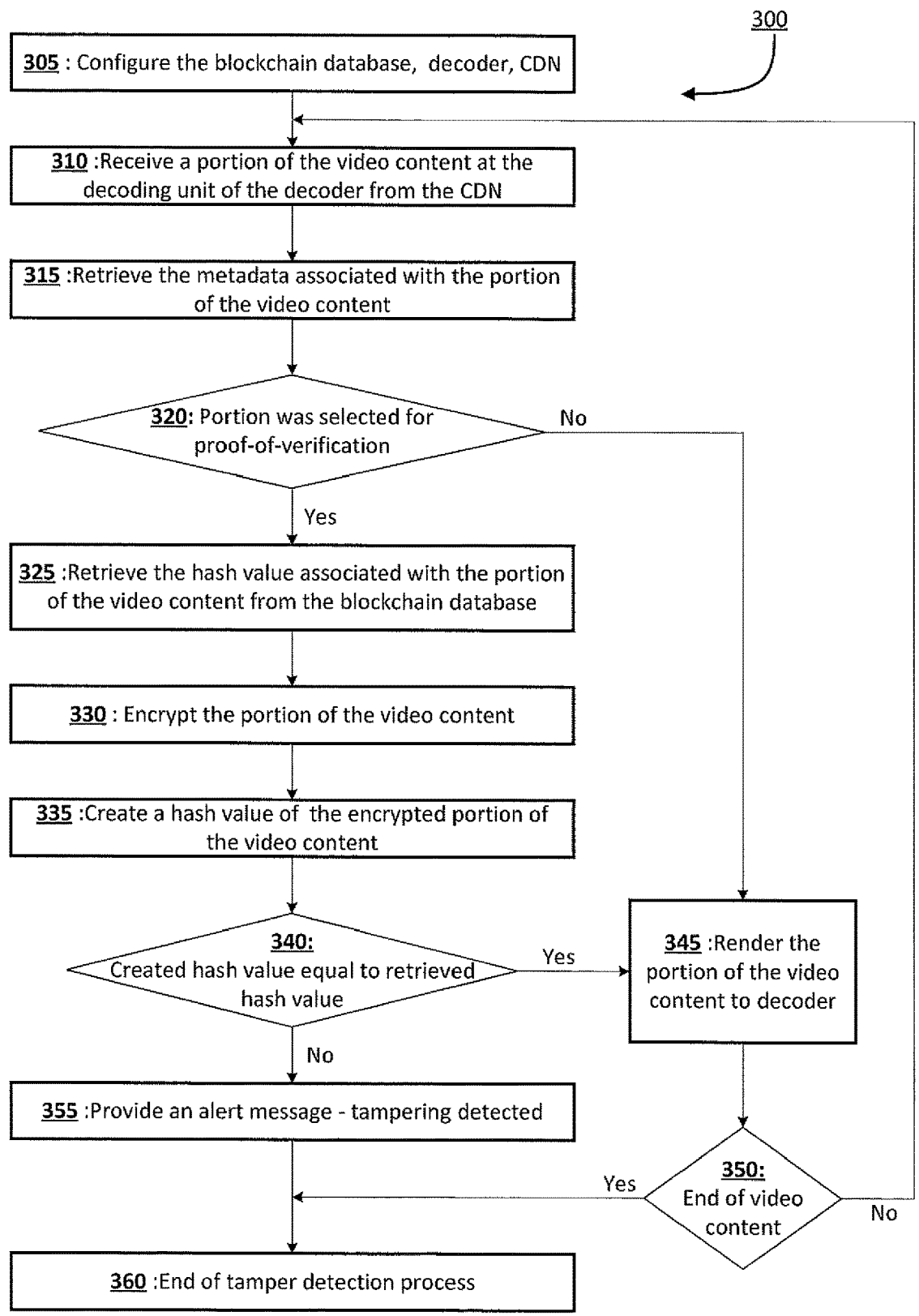
FIG. 3 is a schematic flowchart in accordance with some embodiments of the invention.

Using the environment 105 (illustrated in FIG. 1b and explained above) and the schematic flowchart 300 (illustrated in FIG. 3), along with reference to the environment 100 (as shown in FIG. 1a and explained above) and the output device 170 (as shown in FIG. 9 and explained above), an example of an implementation of the above method 500 (as shown in FIG. 5 and explained above) for detecting tampering of a digital content will now be described.

The decoder 180 shown in the environment 105 which is implemented as an output device 170 in the environment 100 (as described above with reference to FIG. 1) may comprise at least one communication interface 910, one or more processing circuits 930 and a decoding unit 920 (as described above with reference to FIG. 9).

The decoder 180 in effect mirrors most of the steps performed at the encoder 120 for creating the tamper-evident video data. Since for verification the decoder 180 executes many of the process performed during the time of tamper-evident video data creation, the decoding unit in the decoder 180 may need to know certain parameters that were used to encrypt the video content, hash the encrypted video content, the technique used for proof-of-verification, etc.

As part of the initialization process, the different systems in the environment 105 such as the blockchain 140, the decoder 180, and the CDN 160 may be configured (Step 305) initially with the requisite parameters. For example, the address of block chain 140, the address of CDN 160, the type of encryption and the encryption key used for encryption, the type of hashing, the technique used for proof-of-verification, etc. may be pre-configured in the decoder 180.

For example let us consider the scenario wherein the decoder 180 is a video display unit (VDU) which obtains the video from the CDN 160 and displays it to a user of the system. One or more video frames which form a portion of the video content is received (Step 310) at the decoding unit in the decoder 120 from the CDN 160.

For each portion of the video content received from the CDN 160, the decoding unit in the decoder 180 retrieves (Step 315) the metadata associated with the portion of the video content. The metadata retrieved along with the usual video metadata information may include the details about the type information of the blockchain 140, the location identifier may be a blockchain identifier etc. which were embedded into the video content by the encoder 120 before storing into the CDN 180, during the tamper-evident video content creation process as explained above.

For each portion of the video content received, the decoding unit in the decoder 180 needs to determine (Step 320) whether the portion of the video content was selected for proof-of-verification. The decoding unit in the decoder 180 determines whether the portion of the video content was selected for proof-of-verification by using the retrieved metadata associated with the portion of the video content. The metadata may contain an indication on whether frame(s) of the portion of the video content were selected for proof-of-verification operation. The metadata may contain the details about the technique that was used in the encoder 120 to determine whether the portion of the video content is to be selected for proof-of-verification. Then, using the same technique details available in the retrieved metadata, the decoding unit may determine whether the portion of the video content was selected for proof-of-verification. Alternatively, the metadata may contain identification information which indicates the portion of the video content was selected for proof-of-verification.

If the portion of the video content was selected for proof-of-verification then the hash value associated with the portion of the video content is retrieved (Step 325) from the blockchain 140 by the decoding unit using the information available in the retrieved metadata associated with the portion of the video content.

After retrieving the hash value associated with the portion of the video content, the decoding unit in the decoder 180 encrypts (Step 330) the one or more frames of the portion of the video content which were selected for proof-of-verification. The encryption is done by the decoding unit using the same encryption process and the encryption keys which was used in the encoder 120 while creating the tamper-evident video content. The encryption details may be available as part of the metadata associated with the portion of the video content or it may be configured by the user of the decoder 120 and so forth.

The decoding unit in the decoder 180 then computes (Step 335) the hash value of the encrypted portion of the video content using the same hashing technique as used in the smart contract 144 during the tamper-evident video content creation process. The hashing details may be available as part of the metadata associated with the portion of the video content or it may be configured by the user of the decoder 120 and so forth.

The decoding unit in the decoder 180 then compares (Step 340) the newly created hash value of the encrypted portion of the video content with the hash value associated with the portion of the video content retrieved from the blockchain 140.

If the newly created hash value is equal to the retrieved hash value then no tampering is detected. The decoder 180 (such as a smartphone, tablet, personal computer, and so forth) renders (Step 345) the portion of the video content to a user or on an output display, if no tampering is detected by the decoding unit.

If the newly created hash value is not equal to the retrieved hash value then evidence of tampering is detected. On identifying an evidence of tampering of the video content then the decoding unit in the decoder 180 provides (Step 355) an alert message to an external user through the decoder 180.

The decoder 180 while rendering the video content may display a visual cue that corresponds to whether the video content was tampered (when the created hash value is not equal to the retrieved hash value). This cue could be overlaid on the video content, or it could be appearing somewhere in the display of the decoder i.e. the graphical user interface. When the created hash value is not equal to the retrieved hash, the decoder 180 may also enter into an error logging device the details about the exact frames from the video content for which the created hash value is not equal to the retrieved hash value. Thus, by defining and identifying the length of the frame(s) that are selected for the proof-of verification using the different techniques (such as simple sampling, batch sampling etc.) the solution enables in determining exactly which portion of the video content was tampered with.

Also, in the abovementioned step of determining (Step 320) whether the portion of the video content was selected for proof-of-verification, if the portion of the video content was not selected for proof-of-verification then the portion of the video content (as it was received at the decoding unit) is rendered (Step 345) on to an user or on an output display by the decoder 180.

After rendering the portion of the video content to a user or on an output display, the decoding unit in the decoder 180 determines (Step 350) whether the end of the video content has been reached i.e. it checks if any more additional portions of the video content are available in the decoder 180. If more additional portions of the video content are available in the decoder 180, then the above mentioned steps (Step 310 to 355) are performed for each of the additional portions of the video content available in the decoder 180. So, the method 300, after receiving the initial portion of the video content (Step 310) at the decoding unit in the decoder 180 from the CDN 160 enters into a loop, during which the video content is processed until there is some indication that the end of the video content has been reached (e.g., an end-of-file (EOF) bit) (loop at Step 310-355). If no further portions of the video content are available in the decoder 180, then the method 300 for detecting tampering of the video content is ended (Step 360).

After the decoding unit in the decoder 180 provides an alert message about the video tampering identified, the decoding unit in the decoder 180 may either (i) terminate/end (Step 360) the method 300 for detecting tampering of the video content or, (ii) determine (Step 350) whether the end of the video content has been reached i.e. it checks if any more additional portions of the video content are available in the decoder 180 and continue with the tamper detection (as explained above) for the additional portions of the video content if any are available.

FIG. 6 is a schematic flowchart illustrating a process 600 in accordance with some embodiments of the invention. Process 600 is a method for creating tamper-evident digital content. The method includes receiving a portion of the digital content at a computing device (step 610). The computing device may be a media encoding device. The digital content may include media data wherein the media data may comprise media frames; and each said portion of the digital content may comprise at least one media frame. The media data may comprise video data, which could be encoded in various formats, one example being MPEG. So, the digital content may include MPEG encoded data; and each said portion of the digital content may include at least one MPEG I-frame. The method further includes encrypting the portion of the digital content by the computing device when the portion of the digital content is selected for proof-of-verification (step 620). The step of determining if the portion of the digital content is to be selected for proof-of-verification may further include the step of using a predefined technique to determine if the portion of the digital content is to be selected for proof-of-verification wherein the technique is any of: batch sampling technique or simple sampling technique. The encrypting may be done using either a symmetric cryptography or an asymmetric cryptography. The method further includes sending the encrypted portion of the digital content from the computing device to a distributed ledger system (step 630). The distributed ledger system may be a block chain or a database. The method further includes retrieving, by the computing device, hash identification data associated with the encrypted portion of the digital content from the distributed ledger system (step 640). The hash identification data associated with the encrypted first portion of the digital content may further include at least a location identifier of the uploaded first hash value; and a type information of the distributed ledger system. The method further includes creating, by the computing device, an updated portion of the digital content using the retrieved hash identification data (step 650). The step of creating the updated portion of the digital content may further include the step of embedding the retrieved hash identification data with metadata associated with the portion of the digital content. The method further includes storing the updated portion of the digital content in a storage device by the computing device (step 660).

In some embodiments, the method further includes (1) receiving one or more additional portions of the digital content at the computing device; (2) encrypting one of the additional portions of the digital content by the computing device when that additional portion of the digital content is selected for proof-of-verification; (3) sending the encrypted additional portion of the digital content from the computing device to the distributed ledger system; (4) retrieving, by the computing device, hash identification data associated with the encrypted additional portion of the digital content from the distributed ledger system; and (5) creating, by the computing device, an updated additional portion of the digital content using the retrieved hash identification data.

In some embodiments, sending the encrypted portion of the digital content may further include the steps of (1) creating a hash value for the encrypted portion of the digital content received at the distributed ledger system wherein the hash value is created using a smart contract or a stored procedure in the distributed ledger; and (2) storing the hash value in the distributed ledger system wherein storing the hash value in the distributed ledger system comprises storing the hash value in at least one of the data storage units of the distributed ledger system.

FIG. 7 is a schematic flowchart illustrating a process 700 in accordance with some embodiments of the invention. Process 700 is a method for detecting tampering of a digital content. The method includes receiving a portion of the digital content at a computing device (step 710). The computing device may be a media decoding device. The digital content may include media data wherein the media data may comprise media frames; and each said portion of the digital content may comprise at least one media frame. The media data may comprise video data, which could be encoded in various formats, one example being MPEG. So, the digital content may include MPEG encoded data; and each said portion of the digital content may include at least one MPEG I-frame. The method further includes encrypting the portion of the digital content by the computing device when the portion of the digital content contains proof-of-verification (step 720). The step of determining if the portion of the digital content contains proof-of-verification may further include the steps of (1) retrieving metadata information associated with the portion of the digital content; and (2) verifying the retrieved metadata to identify whether the portion of the digital content contains proof-of-verification. The encrypting may be done using either a symmetric cryptography or an asymmetric cryptography. The method further includes computing a first hash value for the encrypted portion of the digital content by the computing device (step 730). The method further includes comparing the computed first hash value with a second hash value associated with the portion of the digital content in the computing device, wherein the second hash value is obtained by the computing device from a distributed ledger system (step 740). The second hash value associated with the portion of the digital content is obtained from the distributed ledger system using the metadata information associated with the portion of the digital content. The distributed ledger system may be a block chain or a database. The method further includes identifying the evidence of tampering of the digital content when the computed first hash value is not equal to the second hash value (step 750). The method further includes providing an alert message to a user or an output medium upon detecting tampering of the digital content (step 760).

In some embodiments, the method further includes (1) receiving one or more additional portions of the digital content at the computing device; (2) encrypting one of the additional portions of the digital content by the computing device when that additional portion of the digital content contains proof-of-verification; (3) computing a first hash value for the encrypted additional portion of the digital content by the computing device; (4) comparing the computed first hash value with a second hash value associated with the additional portion of the digital content in the computing device, wherein the second hash value is obtained by the computing device from the distributed ledger system; and (5) identifying the evidence of tampering of the digital content when the computed first hash value is not equal to the second hash value.

Figure 10:
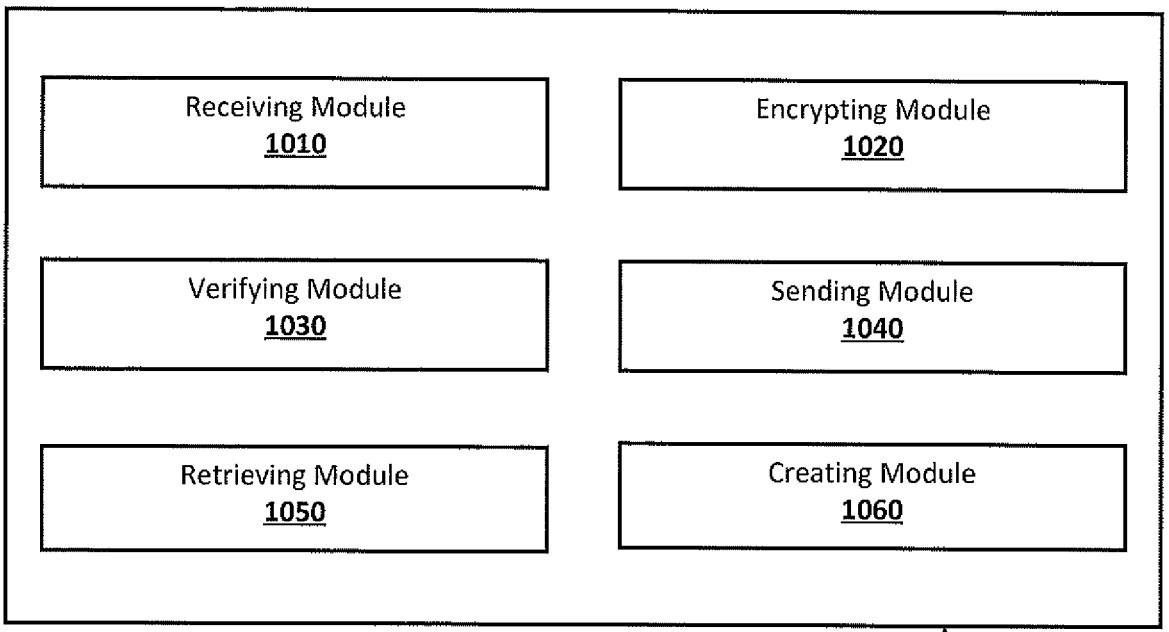
FIG. 10 is a diagram showing functional modules of a computing device for creating a tamper-evident digital content, in accordance with some embodiments of the invention.

FIG. 10 is a diagram showing functional modules of a computing device 110 for creating a tamper-evident digital content, in accordance with some embodiments of the invention. As shown in FIG. 10, a computing device 110 includes a receiving module 1010, an encrypting module 1020, a verifying module 1030, a sending module 1040, a retrieving module 1050 and a creating module 1060. Receiving module 1010 is configured to receive a portion of the digital content. Encrypting module 1020 is configured to encrypt the portion of the digital content when the portion of the digital content is selected for proof-of-verification. Sending module 1040 is configured to send the encrypted portion of the digital content from the computing device 1000 to a distributed ledger system. Retrieving module 1050 is configured to retrieve hash identification data associated with the encrypted portion of the digital content from the distributed ledger system. Creating module 1060 is configured to create an updated portion of the digital content using the retrieved hash identification data. Sending module 1040 is further configured to store the updated portion of the digital content in a storage device.

Figure 11:
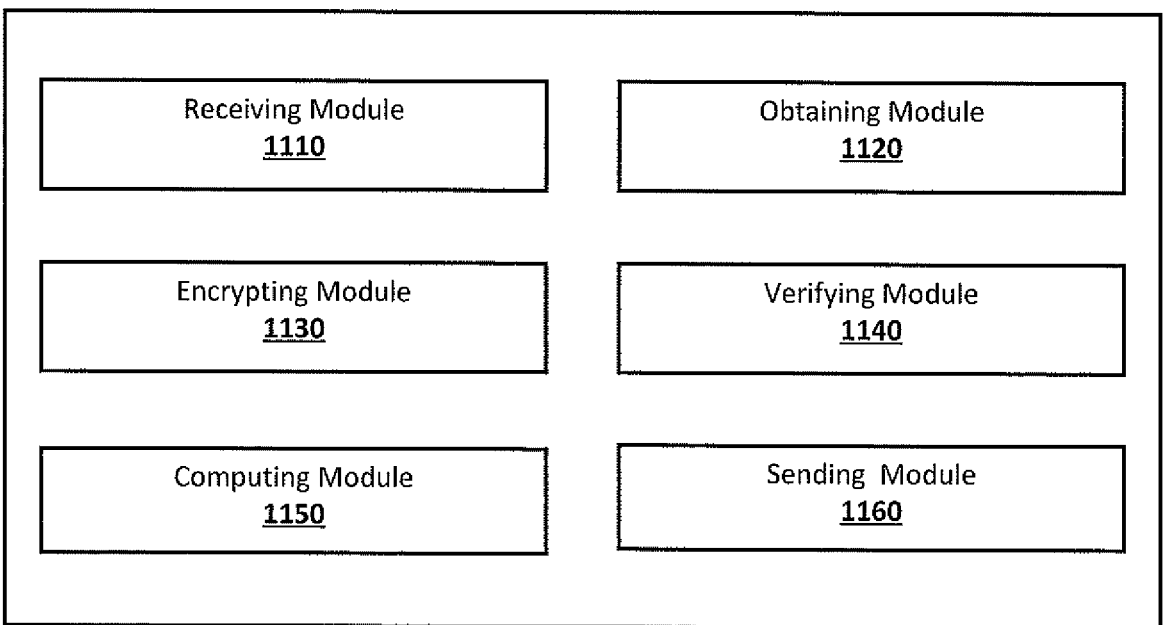
FIG. 11 is a diagram showing functional modules of a computing device for detecting tampering of a digital content, in accordance with some embodiments of the invention.

FIG. 11 is a diagram showing functional modules of a computing device 170 for detecting tampering of a digital content, in accordance with some embodiments of the invention. As shown in FIG. 10, a computing device 170 includes a receiving module 1110, an obtaining module 1120, an encrypting module 1130, a verifying module 1140, a computing module 1150 and a sending module 1160. Receiving module 1110 is configured to receive a portion of the digital content at the computing device. Encrypting module 1130 is configured to encrypt the portion of the digital content when the portion of the digital content contains proof-of-verification. Computing module 1150 is configured to compute a first hash value for the encrypted portion of the digital content Verifying module 1140 is configured to compare the computed first hash value with a second hash value associated with the portion of the digital content in the computing device, wherein the obtaining module 1120 is configured to obtain the second hash value from the distributed ledger system. Verifying module 1140 is further configured to identify the evidence of tampering of the digital content when the computed first hash value is not equal to the second hash value. Sending module 1160 is configured to provide an alert message to a user or an output medium upon detecting tampering of the digital content.

Figure 12:
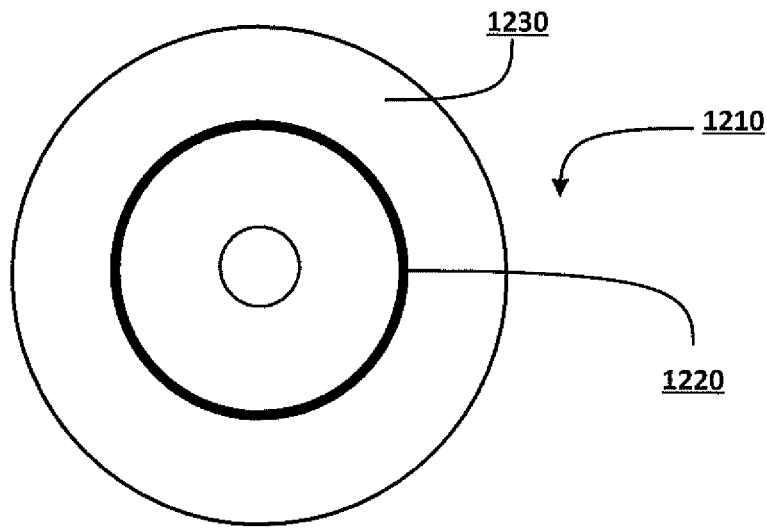
FIG. 12 is a schematic illustration of an embodiment of a computer program product in accordance with some embodiments.

In FIG. 12, a schematic illustration of an embodiment of a computer program product is illustrated. It shows one example of a computer program product 1210 comprising a computer readable storage medium 1230. On this computer readable storage medium 1230, a computer program 1220 can be stored, which computer program 1220 can cause the computing device 110, i.e. the input device 110 and thereto operatively coupled entities and devices, such as the encoding unit 820, to execute methods 200, 600 described herein. The computer program 1220 and/or computer program product 1210 may thus provide means for performing any steps as herein disclosed.

In the example of FIG. 12, the computer program product 1210 is illustrated as an optical disc, such as a CD (compact disc) or a DVD (digital versatile disc) or a Blu-Ray disc. The computer program product 1210 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1220 is here schematically shown as a track on the depicted optical disk, the computer program 1220 can be stored in any way which is suitable for the computer program product 1210.

Figure 13:
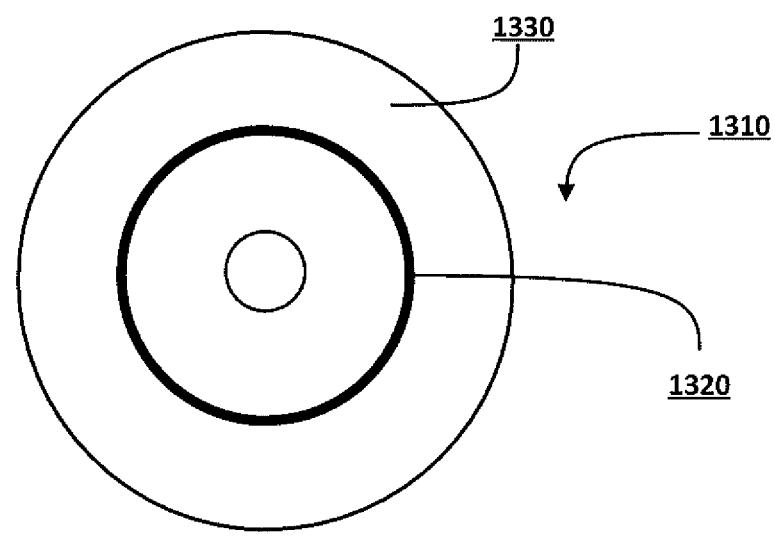
FIG. 13 is a schematic illustration of an embodiment of a computer program product in accordance with some embodiments.

In FIG. 13, a schematic illustration of an embodiment of a computer program product is illustrated. It shows one example of a computer program product 1310 comprising computer readable storage medium 1330. On this computer readable storage medium 1330, a computer program 1320 can be stored, which computer program 1320 can cause the computing device 170 i.e. the output device 170 and thereto operatively coupled entities and devices, such as the decoding unit 920, to execute methods 300, 700 described herein. The computer program 1320 and/or computer program product 1310 may thus provide means for performing any steps as herein disclosed.

In the example of FIG. 13, the computer program product 1310 is illustrated as an optical disc, such as a CD (compact disc) or a DVD (digital versatile disc) or a Blu-Ray disc. The computer program product 1310 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1320 is here schematically shown as a track on the depicted optical disk, the computer program 1320 can be stored in any way which is suitable for the computer program product 1310.

The invention has mainly been described above with reference to a few embodiments. However, as is readily appreciated by a person skilled in the art, other embodiments than the ones disclosed above are equally possible within the scope of the inventive concept, as defined by the appended patent claims.

REFERENCES

1. B. Gipp, N. Meuschke, and A. Gernandt, "Decentralized Trusted Timestamping using the Crypto Currency Bitcoin," inProceedings of the iConference 2015, Newport Beach, California, 2015.

2. Breitinger, Corinna, Gipp, Bela. Virtual Patent: Enabling the Traceability of Ideas Shared Online Using Decentralized Trusted Timestamping in Proceedings of the 15$^{th}$ International Symposium on Information Science (ISI2017), pp. 89-95, http://dx.doi.org/10.18452/1442

3. US20160283920—Authentication and verification of digital data utilizing blockchain technology 4. US20160379330—Method and apparatus for protecting digital photos from alteration

The invention claimed is:

1. A method for creating a tamper-evident digital content, wherein the method comprises:

receiving a portion of the digital content at a computing device;

after receiving the portion of the digital content, the computing device encrypting the portion of the digital content;

after encrypting the portion of the digital content, the computing device sending the encrypted portion of the digital content to a distributed ledger system comprising a block chain database in which a program is stored, wherein the program stored in the block chain database is configured to obtain the encrypted portion of the digital content, generate a hash value using the encrypted portion of the digital content, store the hash value in the block chain database, and provide hash identification data for use in retrieving the hash value from the block chain database, wherein the hash identification data comprises: a block chain identifier identifying the block chain database and a network address of a node hosting the block chain database;

the computing device receiving from the distributed ledger system the hash identification data comprising the block chain identifier and the network address; and the computing device creating an updated portion of the digital content using the retrieved hash identification data, wherein the computing device is separate from the distributed ledger system, creating the updated portion of the digital content further comprises embedding the retrieved hash identification data with metadata associated with the portion of the digital content, and the metadata associated with the portion of the digital content includes a parameter identifying a technique that was used to select the portion of the digital content for proof-of-verification.

2. The method of claim 1, wherein creating the tamper-evident digital content further comprises:

receiving an additional portion of the digital content at the computing device;

after receiving the additional portion of the digital content, the computing device encrypting the additional portion of the digital content;

after encrypting the additional portion of the digital content, the computing device sending the encrypted additional portion of the digital content to the distributed ledger system;

the computing device receiving from the distributed ledger system hash identification data associated with the encrypted additional portion of the digital content from the distributed ledger system; and the computing device creating an updated additional portion of the digital content using the retrieved hash identification data.

3. The method of claim 1, wherein the digital content comprises media data wherein the media data comprises media frames; and each said portion of the digital content comprises at least one media frame.

4. The method of claim 1, further comprising determining whether or not to select the portion of the digital content for proof-of-verification.

5. The method of claim 4, wherein the step of the computing device sending the encrypted portion of the digital content to the distributed ledger system is performed as a result of selecting the portion of the digital content for proof-of-verification.

6. A method for detecting tampering of a digital content, wherein the method comprises:
receiving, at a computing device, a portion of the digital content and metadata for the portion of the digital content, wherein the metadata indicates that the portion of the digital content was selected for proof-of-verification, the metadata for the portion of the digital content includes a parameter identifying a technique that was used to select the portion of the digital content for proof-of-verification, and the metadata comprises hash identification data for use in retrieving from a block chain database a first hash value associated with a first encrypted version of the portion of the digital content, wherein the hash identification data comprises a block chain identifier identifying the block chain database and a network address of a node hosting the block chain database;
encrypting the portion of the digital content by the computing device, thereby creating a second encrypted version of the portion of the digital content;
computing a second hash value for the second encrypted version of the portion of the digital content;
using the hash identification data included in the metadata for the portion of the digital content to obtain from the block chain database the first hash value associated with the first encrypted version of the portion of the digital content;
comparing the first hash value with the second hash value; and
identifying the evidence of tampering of the digital content when the first hash value is not equal to the second hash value, wherein
the computing device is separate from the distributed ledger system.

7. The method of claim 6, wherein detecting tampering of the digital content further comprises:
receiving one or more additional portions of the digital content at the computing device;
encrypting one of the additional portions of the digital content by the computing device when that additional portion of the digital content contains proof-of-verification;
computing a first hash value for the encrypted additional portion of the digital content by the computing device;
comparing the computed first hash value with a second hash value associated with the additional portion of the digital content in the computing device, wherein the second hash value is obtained by the computing device from the distributed ledger system; and
identifying the evidence of tampering of the digital content when the computed first hash value is not equal to the second hash value.

8. A computing device for creating a tamper-evident digital content, the computing device comprising:
one or more processing circuits;
at least one communication interface for communicating with a distributed ledger system and a storage device;
an encoding unit configured to perform a method that includes:
receiving a portion of the digital content at a computing device;
after receiving the portion of the digital content, the computing device encrypting the portion of the digital content by the computing device;
after encrypting the portion of the digital content, the computing device sending the encrypted portion of the digital content to a distributed ledger system comprising a block chain database in which a program is stored, wherein the program stored in the block chain database is configured to obtain the encrypted portion of the digital content, generate a hash value using the encrypted portion of the digital content, store the hash value in the block chain database, and provide hash identification data for use in retrieving the hash value from the block chain database, wherein the hash identification data comprises: a block chain identifier identifying the block chain database and a network address of a node hosting the block chain database;
the computing device receiving from the distributed ledger system the hash identification data comprising the block chain identifier and the network address; and
creating an updated portion of the digital content using the retrieved hash identification data, wherein
the computing device is separate from the distributed ledger system,
creating the updated portion of the digital content further comprises embedding the retrieved hash identification data with metadata associated with the portion of the digital content, and
the metadata associated with the portion of the digital content includes a parameter identifying a technique that was used to select the portion of the digital content for proof-of-verification.

9. The computing device of claim 8, wherein the encoding unit is further configured to store the updated portion of the digital content in the storage device.

10. The computing device of claim 8, wherein the computing device is a media encoding device.

11. The computing device of claim 8, wherein the digital content comprises MPEG encoded data; and each said portion of the digital content comprises at least one MPEG I-frame.

12. A computing device for detecting tampering of a digital content, the computing device comprising:
one or more processing circuits;
at least one communication interface for communicating with a distributed ledger system, an output medium or a user;
a decoding unit configured to perform a method that includes:
receiving, at a computing device, a portion of the digital content and metadata for the portion of the digital content, wherein the metadata indicates that the portion of the digital content was selected for proof-of-verification, the metadata for the portion of the digital content includes a parameter identifying a technique that was used to select the portion of the digital content for proof-of-verification, and the metadata comprises hash identification data for use in retrieving from a block chain database a first hash value associated with a first encrypted version of the portion of the digital content, wherein the hash identification data comprises a block chain identifier identifying the block chain database and a network address of a node hosting the block chain database;

encrypting the portion of the digital content by the computing device, thereby creating a second encrypted version of the portion of the digital content;

computing a second hash value for the second encrypted version of the portion of the digital content;

using the hash identification data included in the metadata for the portion of the digital content to obtain from the block chain database the first hash value associated with the first encrypted version of the portion of the digital content;

comparing the first hash value with the second hash value; and identifying the evidence of tampering of the digital content when the first hash value is not equal to the second hash value, wherein the computing device is separate from the distributed ledger system.

13. The computing device of claim 12, wherein the decoding unit is further configured to provide an alert message to an user or an output medium upon detecting tampering of the digital content.

14. The computing device of claim 12, wherein the computing device is a media decoding device.

15. A computer program product comprising a non-transitory computer readable medium storing a computer program comprising computer-executable instruction for causing a computing device to perform the method of claim 1, when the computer-executable instructions are executed on a processor comprised in the computing device.

16. A computer program product comprising a non-transitory computer readable medium storing a computer program comprising computer-executable instruction for causing a computing device to perform the method of claim 6, when the computer-executable instructions are executed on a processor comprised in the computing device.

* * * * *